United States Patent
Izumi et al.

(10) Patent No.: US 8,504,594 B2
(45) Date of Patent: Aug. 6, 2013

(54) MEMORY MANAGEMENT METHOD, AND MEMORY MANAGEMENT APPARATUS

(75) Inventors: Masaru Izumi, Tokyo (JP); Yoshito Kawazu, Osaka (JP); Yuya Okai, Fujisawa (JP); Koichi Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 293 days.

(21) Appl. No.: 12/388,742

(22) Filed: Feb. 19, 2009

(65) Prior Publication Data

US 2010/0049938 A1 Feb. 25, 2010

(30) Foreign Application Priority Data

Aug. 11, 2008 (JP) .................................. 2008-207412

(51) Int. Cl.
*G06F 12/00* (2006.01)
*G06F 17/30* (2006.01)

(52) U.S. Cl.
USPC ............................................................ 707/813

(58) Field of Classification Search
USPC .......................................................... 707/813
See application file for complete search history.

(56) References Cited

U.S. PATENT DOCUMENTS

| | | | | |
|---|---|---|---|---|
| 6,199,075 B1* | 3/2001 | Ungar et al. | ......................... | 1/1 |
| 7,162,499 B2* | 1/2007 | Lees et al. | ..................... | 709/220 |
| 7,526,513 B2* | 4/2009 | Lees et al. | ............................. | 1/1 |
| 2002/0107879 A1* | 8/2002 | Arnold et al. | ................. | 707/206 |
| 2003/0097537 A1* | 5/2003 | Bollella et al. | ................ | 711/170 |
| 2003/0191783 A1* | 10/2003 | Wolczko et al. | .............. | 707/206 |
| 2007/0011109 A1* | 1/2007 | Wilson et al. | .................... | 706/11 |
| 2009/0030959 A1* | 1/2009 | Beard | ........................... | 707/206 |
| 2010/0034868 A1* | 2/2010 | Everland et al. | ............. | 424/426 |
| 2010/0049938 A1* | 2/2010 | Izumi et al. | .................... | 711/170 |

OTHER PUBLICATIONS

Fadel, R et al., "Heaps and heapsort on secondary storage", 1999, PII: S0304-3975(99)00006-7.*
Angelo Corsaro, et al., "Efficient Memory-Reference Checks for Real-Time Java", Proceedings of the 2003 ACM SIGPLAN conference on Language, compiler and tool for embedded systems, 2003.
F. Pizlo, et al. "Real-Time Java Scoped Memory: Design Patterns and Semantics", Proceedings of the Seventh IEEE International Symposium on Object-Oriented Real-Time Distributed Computing, 2004.

\* cited by examiner

*Primary Examiner* — Shyue Jiunn Hwa
*Assistant Examiner* — Muluemebet Gurmu
(74) *Attorney, Agent, or Firm* — Mattingly & Malur, PC

(57) ABSTRACT

When a program execution unit of a computer executes a creation instruction of objects utilized by an execution target program in process of executing the execution target program, the program execution unit disposes a created object in an internal heap when a life period of the created object is not contained within life period of objects for root class and gets average value of life time corresponding to set of objects to which the created object belongs with reference to memory allocation information table to dispose the created object as a long-life object in an external heap when the gotten average value of life time is equal to or larger than a predetermined value. Accordingly, life time of objects is measured and long-life objects are not managed by GC, so that program utilizing objects can be executed at high speed.

16 Claims, 21 Drawing Sheets

UTILIZATION RELATION BETWEEN CLASSES

INFORMATION CONCERNING ALLOCATION OF CLASSES

| CLASS NAME | AREA SIZE | CREATION TIME | RELEASE TIME |
|---|---|---|---|
| RootClass | 100 | 10:00 | 10:20 |
| MemberClass1 | 10 | 10:01 | 10:20 |
| MemberClass2 | 200 | 10:01 | 10:20 |
| MemberClass2 | 30 | 10:05 | 10:14 |
| OtherClass1 | 50 | 10:07 | 10:45 |
| OtherClass2 | 100 | 10:03 | 10:45 |

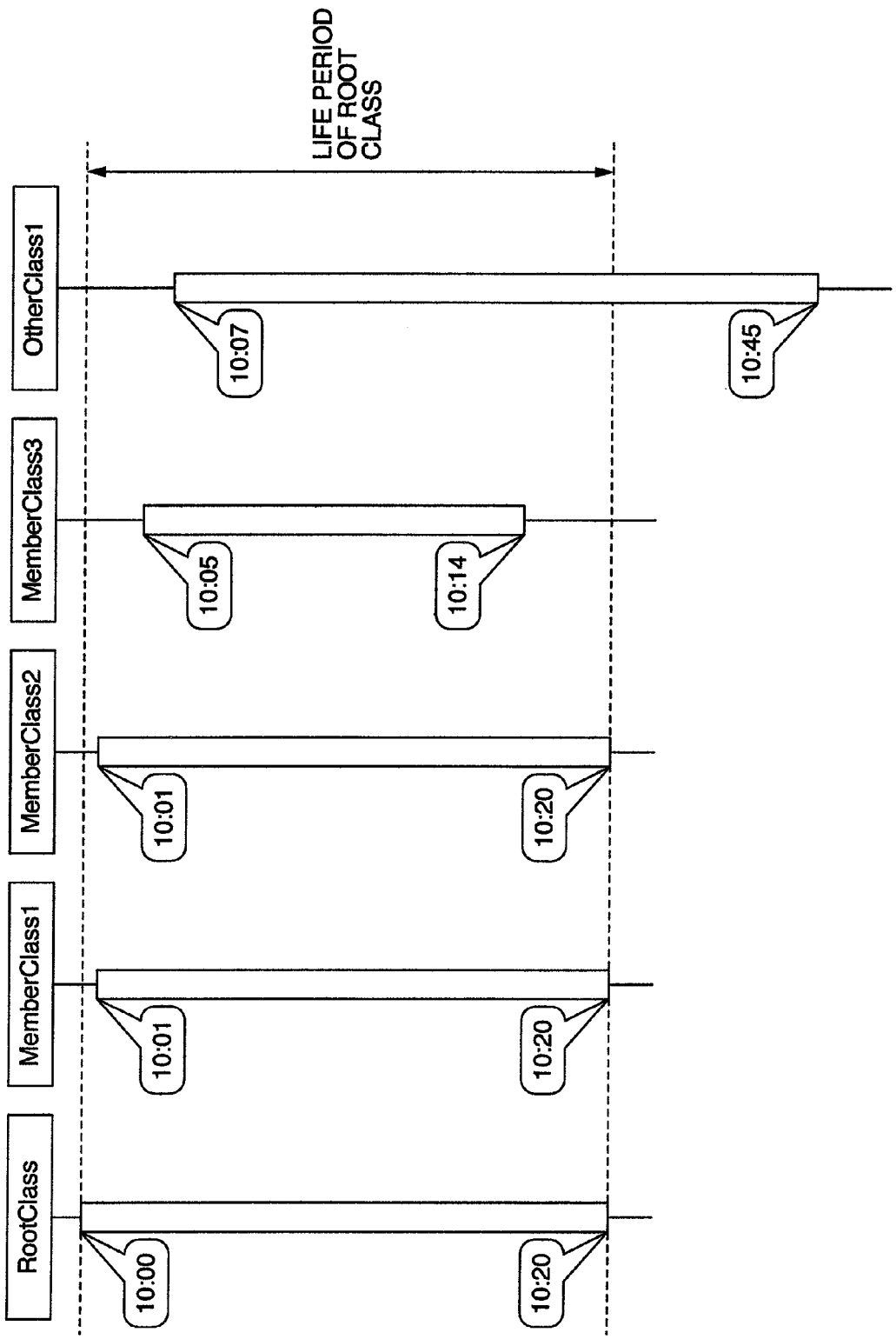

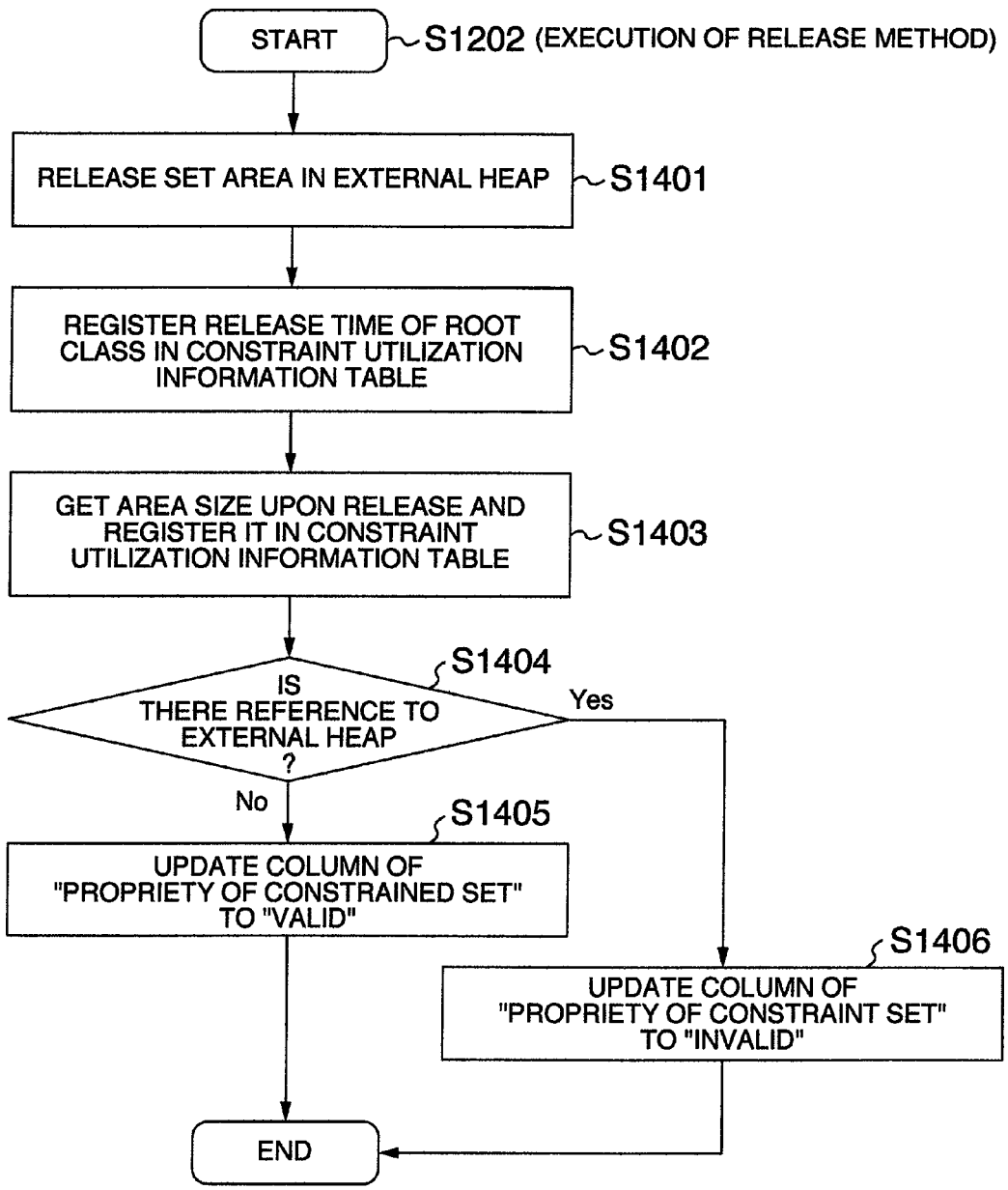

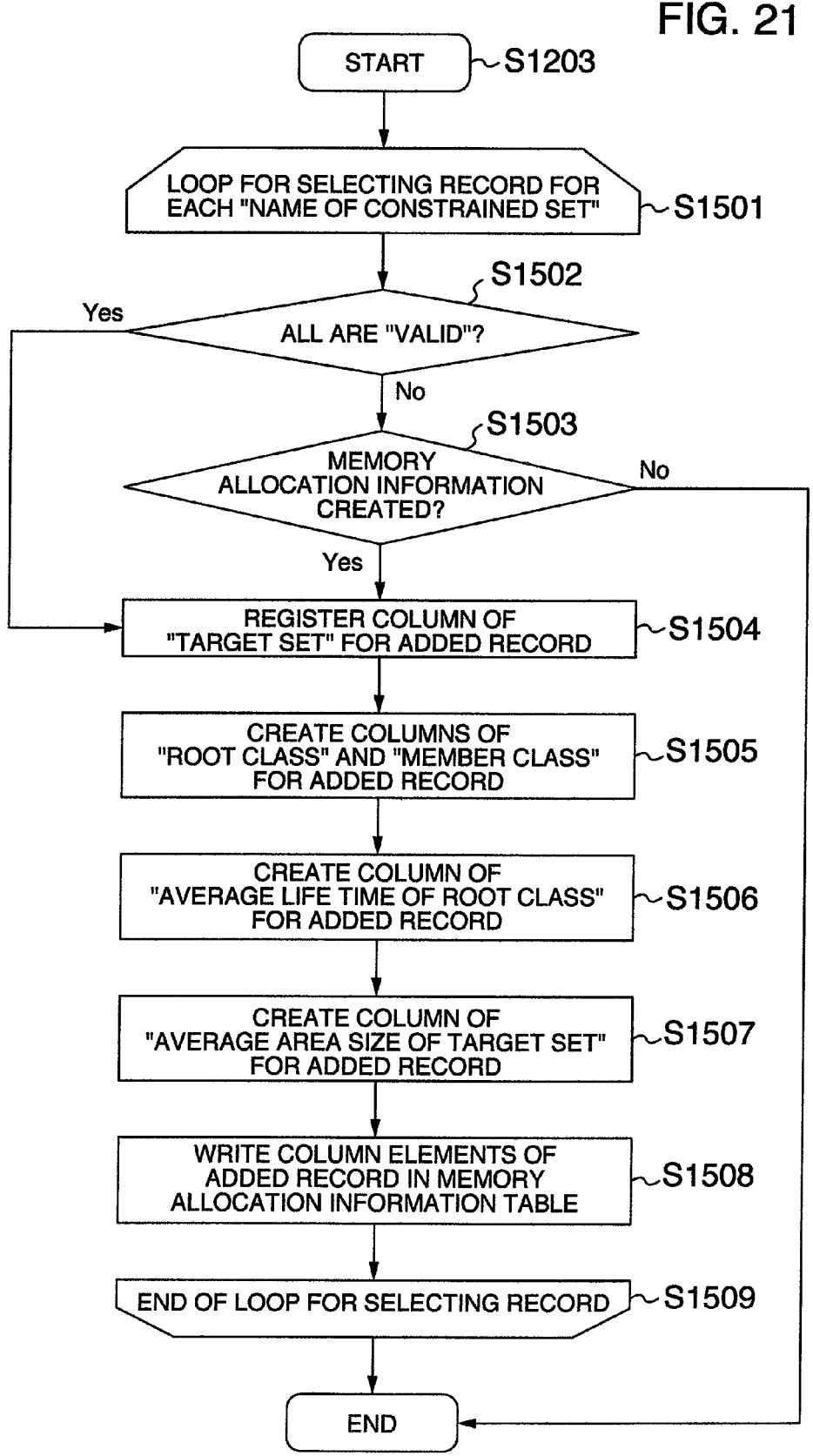

MEMORY MANAGEMENT METHOD, AND MEMORY MANAGEMENT APPARATUS

INCORPORATION BY REFERENCE

The present application claims priority from Japanese application JP 2008-207412 filed on Aug. 11, 2008, the content of which is hereby incorporated by reference into this application.

BACKGROUND OF THE INVENTION

The present invention relates to technique concerning a memory management method, a memory management program and a memory management apparatus.

The garbage collection (GC) is technique for automatically realizing memory management for a heap area in a memory (particularly, release of unnecessary memory area being occupied) even when specified instruction is not issued from program. The GC is automatically started and accordingly there is proposed a method that influence of load by the GC is suppressed for important control such as real time processing (refer to Angelo Corsaro and Ron K. Cytron, "Efficient memory-reference checks for real-time java", Proceedings of the 2003 ACM SIGPLAN conference on Language, compiler and tool for embedded systems, 2003 and F. Pizlo, J. M. Fox, D. Holmes and J. Vitek, "Real-time Java scoped memory: design patterns and semantics", Proceedings of the Seventh IEEE International Symposium on Object-Oriented Real-Time Distributed Computing, 2004).

The heap area is classified into internal and external heaps.

The internal heap is a heap area to be managed by the GC and is realized as Java (Registered Trademark) heap executed in Java language, for example.

The external heap is a heap area not to be managed by the GC and the memory management therefor is realized by specified instruction from program (manually).

There are some algorithms for realizing the GC. Two algorithms thereof are now described by example.

The "mark and sweep GC" has the algorithm of marking objects from root object of program in the heap area along links successively, sweeping objects which are not marked (are floating in the air) from the heap area and compacting hashed memory spaces in the heap area into one place.

The "copying GC" has the algorithm of partitioning memory space into a plurality of sections in which only one section thereof is set as a heap area to be managed by the GC, constraining processing of marking objects along links within one section and copying objects connected to one another through links to another section in unit thereof.

SUMMARY OF THE INVENTION

As technique concerning securement of memory in Java language, there is technique that long-life object is secured in external heap, so that load is suppressed from being increased due to execution of GC (refer to U.S. application Ser. No. 12/038,376, for example). The life time of object means the length of the period from creation of object in memory to its release.

In other words, processing load on GC is also increased due to increased objects to be managed by GC. Accordingly, long-life (that is, influence on processing load is increased) objects are disposed in external heap not to be managed by GC instead of internal heap to be managed by GC, so that objects to be managed by GC are suppressed and processing load on GC is also suppressed.

Objects are divided so that short-life objects are disposed in internal heap and long-life objects are disposed in external heap, so that automatic memory management by GC and manual memory management by specified instruction can be balanced.

When the aforementioned method of dividing the heap area in accordance with life time of objects is realized, the processing of measuring life time of objects is important and difficult problem.

It is necessary to consider life cycles of objects in order to judge which object lives long actually and advanced knowledge is required. Furthermore, whether object lives long is often decided even depending on utilization situation and circumstances of program to be executed.

When a new program is prepared, it is very difficult to make programming while which object lives long is previously considered consciously and accordingly it is difficult to prepare the program which can utilize external heap area effectively.

It is often decided depending on utilization situation and circumstances whether object lives long and object which lives long in a certain utilization situation does not necessarily live long even in another utilization situation. Accordingly, even if objects are always ensured in external heap area, processing load on GC cannot be necessarily suppressed from being increased.

Accordingly, it is an object of the present invention to solve the above problems by measuring life time of objects not to manage long-life objects by GC, so that program utilizing objects can be executed at high speed.

In order to solve the above problems, according to the present invention, a memory management method in which a heap area in a memory to which objects are allocated is divided into an internal heap to which garbage collection (GC) is applied and an external heap which is managed by program specifically and an area to which object is allocated is decided on the basis of life time of object, is executed by a computer, and the computer comprises an input unit, a target set processing unit, memory allocation data and a program execution unit in addition to the memory constituting the internal heap and the external heap, the input unit receiving execution target program, set definition data representing sets of objects utilized by the execution target program and analysis program utilizing the sets of objects represented by the set definition data, the target set processing unit performing the following:

executing the analysis program on trial to get life periods from creation time to release time in memory for the sets of objects utilized by the analysis program and calculate life times of objects on the basis of length of the gotten life periods, and storing names of sets of objects and average values of life times of objects for root class designated by the set definition data out of objects constituting the sets of the objects in a corresponding manner to each other as the memory allocation data in storage means, the program execution unit performing, when executing a creation instruction of the objects utilized by the execution target program in process of executing the execution target program, the following:

disposing a created object in the internal heap when a life period of the created object is not contained within life period of the objects for root class, and getting average value of life time corresponding to set of objects to which the created object belongs with reference to the memory allocation data, disposing the created object as a long-life object in the external heap when the gotten average value of life time is equal to or larger than a predetermined value, and disposing the created object as a short-life object in the internal heap when the gotten average value of life time is smaller than the predetermined value.

According to the present invention, life time of objects is measured and objects are not managed by GC properly, so that program utilizing objects can be executed at high speed.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram illustrating life times (life periods) of class according to the embodiment of the present invention;

FIG. 20 is a flow chart showing area release processing of constrained set 12 executed by constraint root class disposition unit 34 according to the embodiment of the present invention; and FIG. 21 is a flow chart showing registration processing of memory allocation information table 40 executed by constraint memory allocation information creation unit 37 according to the embodiment of the present invention;

DESCRIPTION OF THE EMBODIMENTS

An external heap application support apparatus (memory management apparatus) according to an embodiment of the present invention is now described with reference to the accompanying drawings. The external heap application support apparatus selects object having heavy processing load on the basis of life times of objects and allocates the selected object to external heap area not to be managed by GC.

Figure 1A:
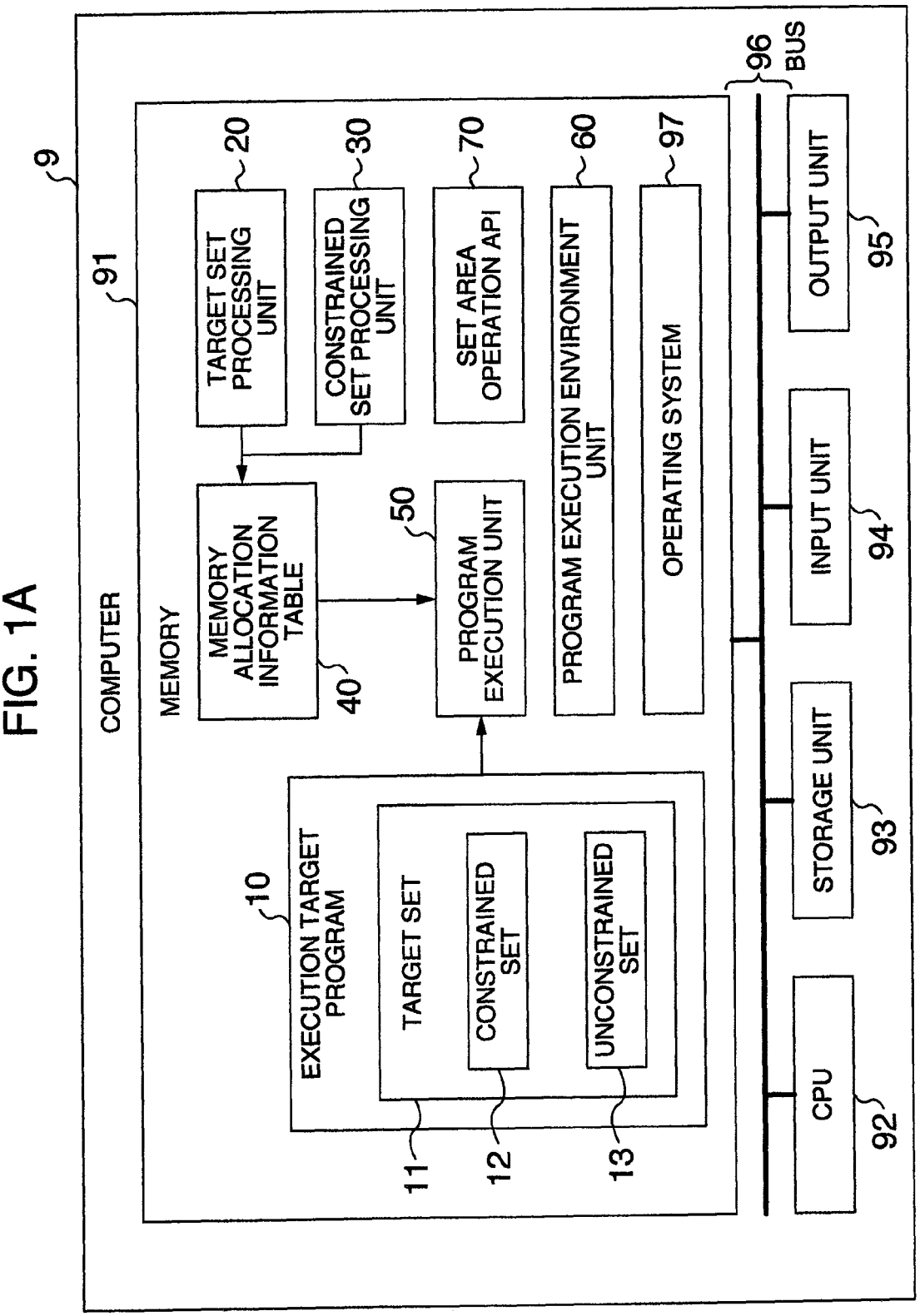
FIGS. 1A and 1B are schematic diagrams illustrating a computer 9 realizing an external heap application support apparatus including memory division means according to an embodiment of the present invention.

FIG. 1A is a schematic diagram illustrating a computer 9 realizing the external heap application support apparatus including memory division means.

The computer 9 is realized by computer such as personal computer (PC) and server and includes a memory 91, a central processing unit (CPU) 92, a storage unit 93, an input unit 94, an output unit 95 and a bus 96 for connecting them to one another.

The memory 91 includes an execution target program 10, a target set processing unit 20, a constrained set processing unit 30, a memory allocation information table (memory allocation data) 40, a program execution unit 50, a program execution environment unit 60 and set area management API (application programming interface) 70 in addition to an operating system 97.

The execution target program 10 is described in object-oriented language such as Java language. Object-oriented class is described in source code of the execution target program 10 and the class is materialized as object in heap area upon execution.

The execution target program 10 utilizes a target set 11. The target set 11 includes a constrained set 12 and an unconstrained set 13 (for further information, refer to FIG. 3).

The target set 11 is an object group having similar life time and is a general term of the constrained set 12 and the unconstrained set 13.

The constrained set 12 is a capsuled target set 11 and is the target set 11 which satisfies constraints including 5 rules (1st to 5th rules) described later.

The unconstrained set 13 is the target set 11 which does not satisfy constraints conversely to the constrained set 12 and is a complementary set of the constrained set 12 belonging to the target set 11.

The target set processing unit 20 executes the target set 11 (mainly unconstrained set 13 but constrained set 12 may be possible) on trial and writes its result into the memory allocation information table 40. In the embodiment, "set" means a set of one or more objects created from class. Objects belonging to the same set have utilization (reference) relation.

The constrained set processing unit 30 executes the constrained set 12 on trial and writes its result into the memory allocation information table 40.

The memory allocation information table 40 manages trial execution results such as life periods of sets (also named life times of sets) for each target set 11 (for further information, refer to Table 2).

The program execution unit 50 executes the execution target program 10. At this time, the target set 11 utilized from the execution target program 10 is allocated to heap area. The program execution unit 50 judges whether the target set 11 has long or short life time on the basis of life periods of sets in the memory allocation information table 40 and selects heap area to which the target set 11 is allocated in accordance with its judgment result.

The program execution environment unit 60 is execution environment of the program execution unit 50 realized as Java virtual machine (VM), for example, and is executed on the operating system 97.

Figure 1B:
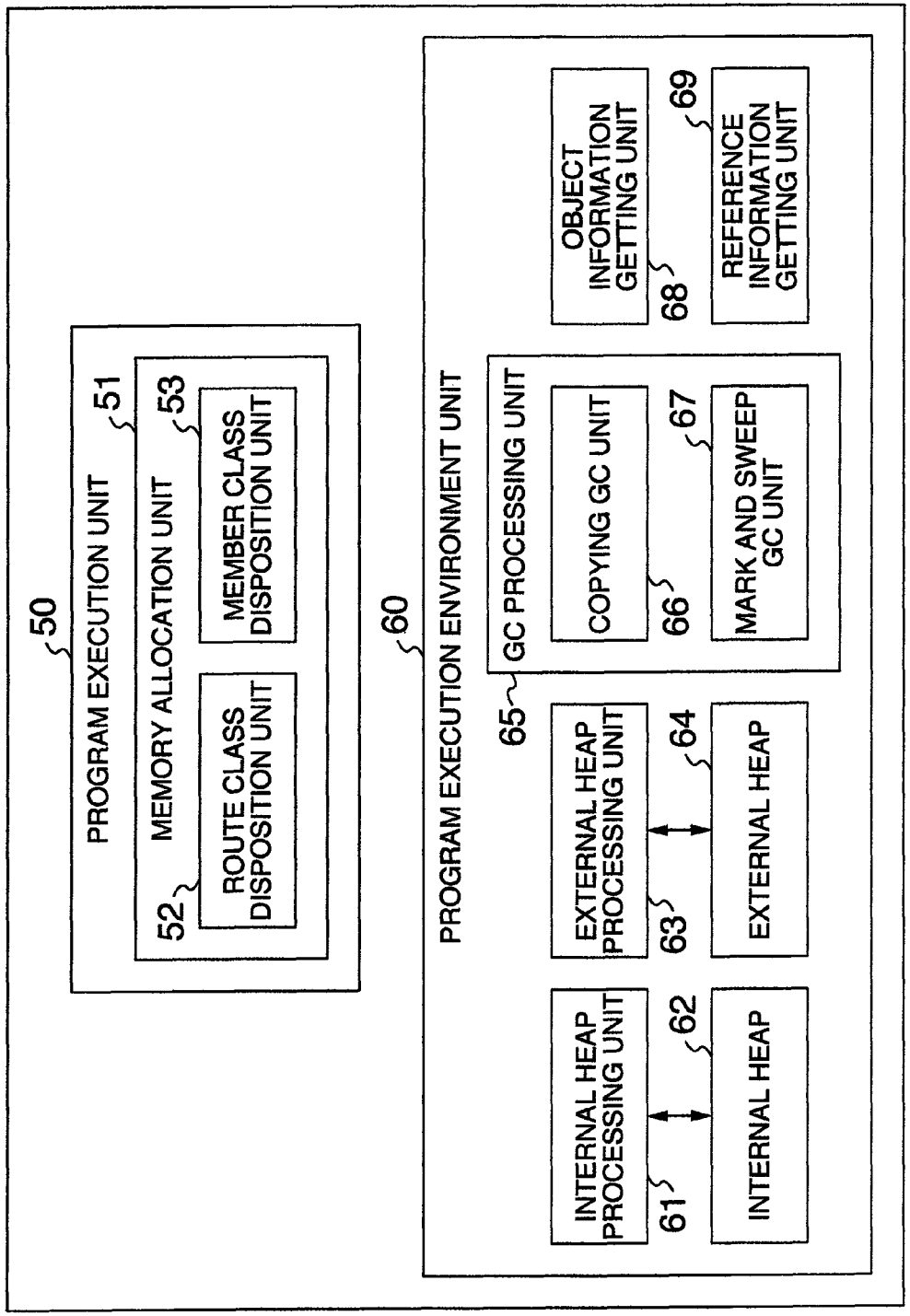

FIG. 1B schematically illustrates the program execution unit 50 and the program execution environment unit 60 included in the computer 9 of FIG. 1A in detail.

The program execution unit 50 includes a memory allocation unit 51, which includes a root class disposition unit 52 and a member class disposition unit 53.

The root class disposition unit 52 disposes root class of the target set 11 in the heap area (internal heap 62 or external heap 64). One target set 11 includes one root class. The root class is a class existing in root when utilization relation between classes is viewed as the tree structure.

The member class disposition unit 53 disposes member classes of the target set 11 in the heap area (internal heap 62 or external heap 64). One or more member classes are utilized from one root class. Accordingly, one target set 11 includes one or more member classes.

The program execution environment unit 60 includes internal heap processing unit 61, internal heap 62, external heap processing unit 63, external heap 64, GC processing unit 65, object information getting unit 68 and reference information getting unit 69. The GC processing unit 65 includes copying GC unit 66, and mark and sweep GC unit 67.

The internal heap processing unit 61 takes charge of memory allocation processing for the internal heap 62 and the external heap processing unit 63 takes charge of memory allocation processing for the external heap 64.

The internal heap 62 is a heap area for which memory management is executed automatically (that is, heap area to be managed by GC). The internal heap 62 is realized as Java heap, for example.

The external heap 64 is a heap area for which memory management is executed manually (that is, heap area not to be managed by GC and required to be subjected to memory management from program specifically).

Accordingly, the internal heap 62 and the external heap 64 are different in the point as to whether it is managed by GC or not.

When data stored in the internal heap is increased, the data is to be managed by GC and accordingly memory management is easy, whereas load by processing of GC is increased.

When data stored in the external heap is increased, load is not increased so much, although memory management is required to be specifically performed manually.

The GC processing unit 65 executes GC to the internal heap 62. The copying GC unit 66 for executing the copying GC method and the mark and sweep GC unit 67 for executing the mark and sweep GC method are executed according to the algorithm of GC.

The object information getting unit 68 and the reference information getting unit 69 monitor allocation situation of objects of the target set 11 in the internal heap 62 and the external heap 64 and as a result the object information getting unit 68 gets allocation history of objects and the reference information getting unit 69 gets reference relation between objects.

The set area management API 70 is utilized from execution target program 10 and makes securement and release of set area of the target set 11.

Figure 2:
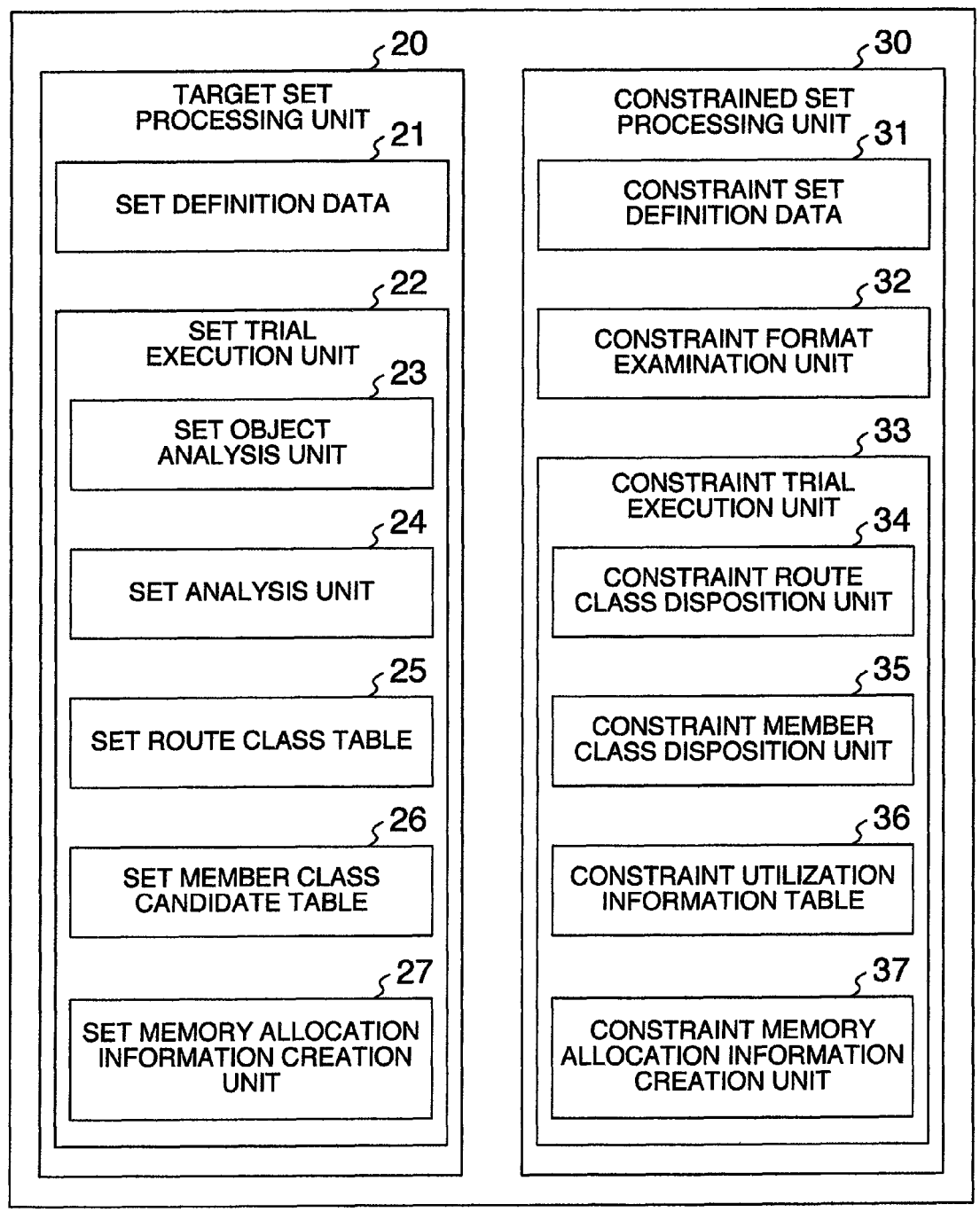
FIG. 2 is a schematic diagram illustrating a target set processing unit 20 and a constrained set processing unit 30 according to the embodiment of the present invention in detail.

FIG. 2 schematically illustrates the target set processing unit 20 and the constrained set processing unit 30 included in the computer 9 of FIG. 1A in detail. The details of each data structure (each table) are described in each table described later and the details of each processing unit are described in each flow chart shown later.

The target set processing unit 20 includes a set definition data 21 (for further information, refer to Table 3) and a set trial execution unit 22.

The set trial execution unit 22 includes a set object analysis unit 23, a set analysis unit 24, a set root class table 25 (for further information, refer to Table 4), a set member class candidate table 26 (for further information, refer to Table 5) and a set memory allocation information creation unit 27.

The constrained set processing unit 30 includes constraint set definition data 31 (for further information, refer to Table 6), a constraint format examination unit 32 and a constraint trial execution unit 33.

The constraint trial execution unit 33 includes a constraint root class disposition unit 34, a constraint member class disposition unit 35, a constraint utilization information table 36 (for further information, refer to Table 7) and a constraint memory allocation information creation unit 37.

Figure 3:
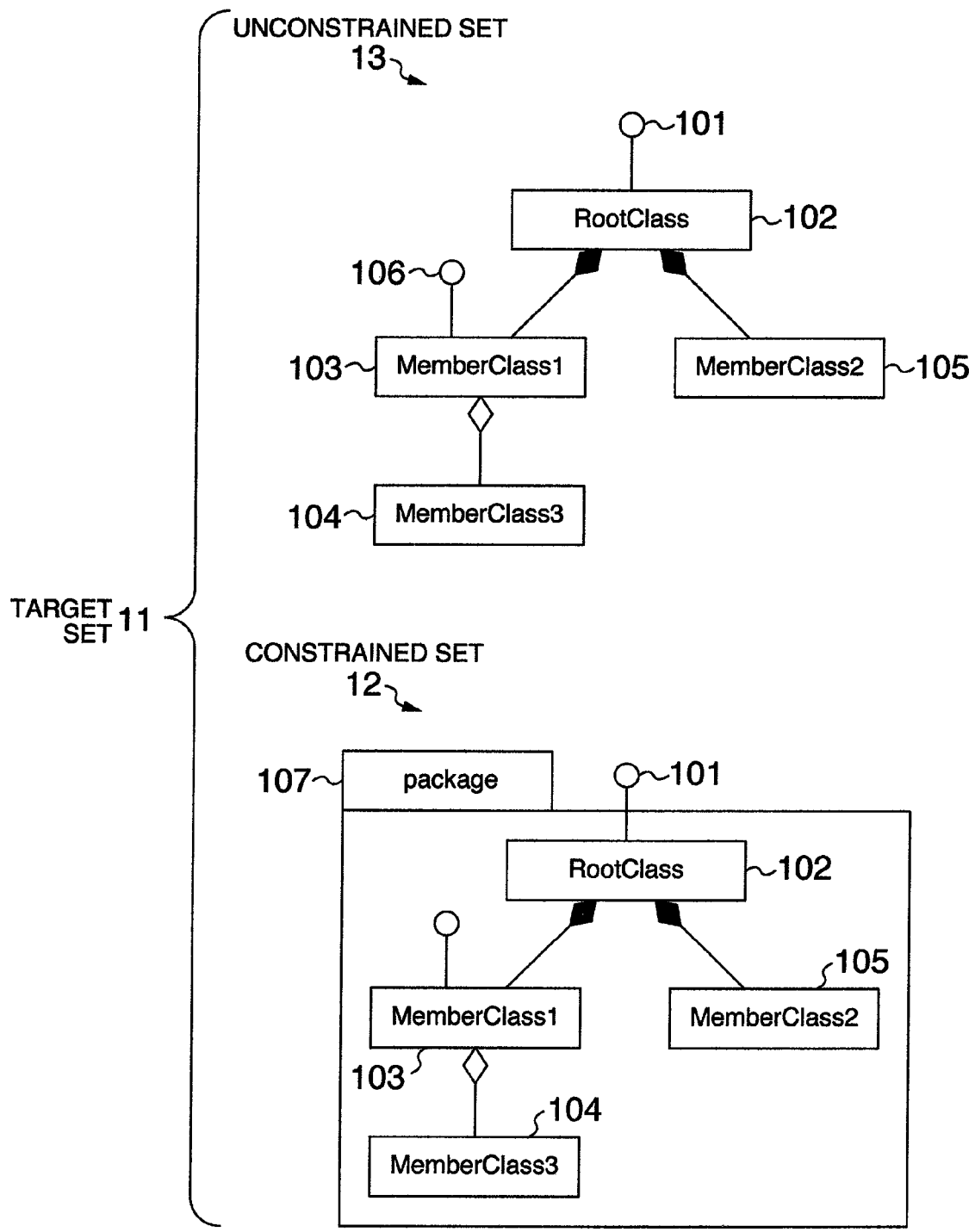
FIG. 3 is a class diagram illustrating an example of class structure of target set 11 utilized by execution target program 10 according to the embodiment of the present invention.

FIG. 3 is a class diagram showing an example of the class structure of target set 11 (constrained set 12 and unconstrained set 13) utilized from the execution target program 10.

The target set 11 is a set of objects in which the reference relation is constructed while defining the object forming root as starting point and the life periods of other objects are contained within the life period of the object forming the root.

The root class ("RootClass" 102) is a class forming root when the reference relation is arranged into a tree structure.

Member classes ("MemberClass1" 103, "MemberClass2" 105 and "MemberClass3" 104) are classes except the root class and referred from the root class.

In the unconstrained set 13, interfaces 101 and 106 are added to "RootClass" 102 and "MemberClass1" 103, respectively, so that utilization from external class is permitted.

The reference relation between classes is shown by mark (straight line with diamond) connecting between classes. Classes having diamond attached thereto are classes of reference sources. For example, "RootClass" 102 refers to "MemberClass1" 103 and "MemberClass2" 105.

Painted diamond from "RootClass" 102 represents "composition" and when object of reference source is eliminated, object referred to therefrom is also eliminated.

On the other hand, non-painted diamond represents "aggregation" and when object of reference source is eliminated, object referred therefrom is not eliminated.

The constrained set 12 is a set of objects satisfying constraint of the target set 11. The constraint means that object except the constrained set 12 can utilize only root class of the constrained set 12. Concretely, in the constrained set 12, only "RootClass" 102 provides interface 101. Object which does not belong to the constrained set 12 cannot utilize member classes which do not provide interface in constrained set 12.

Member classes cannot be utilized from object except constrained set 12 and accordingly when root class ("RootClass" 102) is eliminated, all member classes ("MemberClass1" 103, "MemberClass2" 105 and "Member Class3" 104) are also eliminated.

Rules of the constrained set 12 are now described concretely.

When the rule that "utilization can be made by only root class of the constrained set 12 from object except the constrained set 12" is applied to Java language, rules are passed when all of the following first to fifth rules are satisfied.

The first rule is that all of classes composing the constrained set 12 must declare in the same package 107.

The second rule is that only one of root classes of the constrained set 12 must declare as public class in the package declared in the first rule.

The third rule is that member classes of the constrained set 12 must declare as package-private class.

The fourth rule is that method (interface 101) which declares as public of the root class of the constrained set 12 must not return member class as return value.

The fifth rule is that field of root class and field, method and constructor of member classes of the constrained set 12 must not declare as public.

Program defined in accordance with the five rules is the target set 11. Grounds thereof are now described on the basis of matters derived from the rules.

According to the fifth rule, object of member class can be created within root class and member class of the same package.

According to the fourth rule, object of member class is not delivered to object except the constrained set 12 and accordingly root class and member class can hold member class. Therefore, the life period of member class is contained within the life period of root class.

That is, program defined in accordance with five rules is the target set 11.

Program defined in accordance with the five rules is the constrained set 12 since only root class of the constrained set 12 can utilize it from object except the constrained set 12. Grounds thereof are now described on the basis of matters derived from the rules.

According to the third rule, type of member class cannot be utilized from object except the constrained set 12.

According to the fifth rule, field, method and constructor of member class cannot be utilized from object except the constrained set 12.

According to the fifth rule, object of member class can be created within root class and member class of the same package.

According to the fourth rule, object of member class is not delivered to object except the constrained set 12.

Figures 4A, 4B:
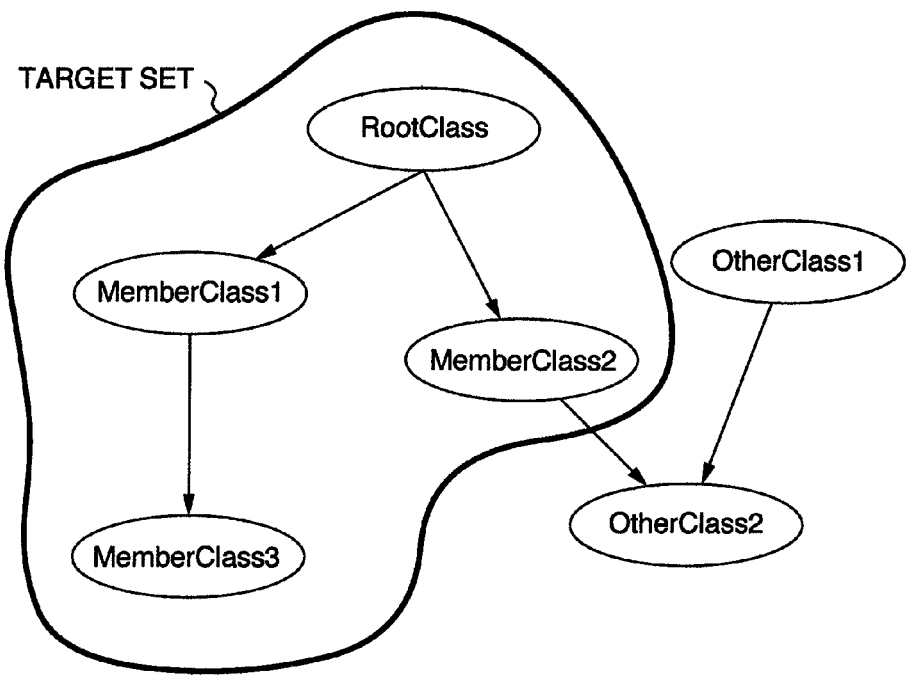
FIGS. 4A and 4B are diagrams illustrating life or existence of target set 11 according to the embodiment of the present invention.

FIGS. 4A and 4B schematically illustrate the state of life of the target set 11.

FIG. 4A illustrates utilization relation between classes using arrows.

"RootClass" is object of root class of the target set 11. "MemberClass1", "MemberClass2" and "MemberClass3" are objects of member classes of the target set 11. "OtherClass1" and "OtherClass2" are objects except the target set 11. The target set 11 is composed of "RootClass", "MemberClass1", "MemberClass2" and "MemberClass3".

Arrows of FIG. 4A are followed successively to trace reference. To trace reference is that object referred to directly by object is searched and object referred to by the referred object is searched so that objects are searched recurrently and a target object can be found finally.

FIG. 4B is a table showing information concerning allocation of classes of FIG. 4A. This table shows correspondence of class name, area size (byte) of allocated class, creation time representing allocation time of class and release time representing time that allocation of class is released for each class. The life time of class can be calculated from difference between the release time and the creation time.

FIG. 5 shows the life times (life periods) of classes shown in FIG. 4A ("OtherClass2" is omitted). Classes are shown in the horizontal direction and time axis (time elapses in the downward direction) is shown in the vertical direction. Rectangle representing the life period is shown for each class.

For example, "RootClass" of the root class has the creation time of "10:00" and the release time of "10:20", so that the life time is 20 minutes.

When the creation time of a certain class is later than that of the root class and the release time of the certain class is earlier than that of the root class, it is expressed that "the life period of a certain class is contained within that of the root class."

For example, the life periods of member classes ("MemberClass1", "MemberClass2" and "MemberClass3") are contained within the life period of the root class. However, the life period of "OtherClass1" is not contained within that of the root class.

When "creation and release" of a certain class are repeated plural times within the life period of one root class and all of plural life periods of the certain class are contained within the life period of the root class, it is defined that there is inclusion relation.

Data structure contained in the computer 9 shown in FIG. 1A is now described in a table format.

TABLE 1

| COLUMN NUMBER | CONTENTS |
| --- | --- |
| | 11 Target Set (12 Constrained Set) |
| 1 | package x; |
| 2 | public class RootClass{ |
| 3 |     private MemberClass1 m1; |
| 4 |     MemberClass2 m2; |
| 5 |     public int getData( ) { |
| 6 |         this.m1 = new MemberClass1( ); |
| 7 |         return m1.get( ); |
| 8 |     } |
| 9 | } |
| 10 | class MemberClass1 { |
| 11 |     private int i=1; |
| 12 |     MemberClass3 m3; |
| 13 |     MemberClass1( ) {...} |
| 14 |     int get( ) {return i;} |
| 15 | } |
| 16 | class MemberClass2{...} |
| 17 | class MemberClass3{...} |

Table 1 shows an example of program describing the target set 11 (constrained set 12). This program is described in accordance with Java grammar.

1st line represents declaration sentence of package (package x).

2nd, 10th, 16th and 17th lines represent declaration sentences of classes (RootClass, MemberClass1, MemberClass2 and MemberClass3).

RootClass is a root class and has modifier [public] added thereto.

MemberClass1, MemberClass2 and MemberClass3 are member classes and are package-private (referable to from only its own package) class since modifier is omitted.

5th to 8th lines represent getData method. This getData method is public method of root class and does not return member class as return value.

3th and 4th lines represent fields [m1] and [m2] of root class, respectively.

11th and 12th lines represent fields [i] and [m3] of member class, respectively.

13th line represents constructor [MemberClass1] of member class.

14th line represents get method. This get method is method of member class and does not declare public.

As described below, the target set 11 is the constrained set 12 since it satisfies all of five rules.

The first rule is satisfied since each class is contained in package x.

The second and third rules are satisfied by declaration of modifier of each class or omission thereof.

The fourth rule is satisfied by declaration of getData method.

The fifth rule is satisfied by declarations of field of root class, and declarations of field, constructor and get method of member class.

TABLE 2

40 Memory Allocation Information Table

| Name of Target Set | Root Class | Member Class | Average Life Time of root class | Average Area Size of Target Set |
|---|---|---|---|---|
| a | x. RootClass | x. MemberClass1 x. MemberClass2 x. MemberClass3 | 10 minutes | 64 KB |
| b | y. A | y. B | 20 minutes | 96 KB |
| c | p. RootClass | p. MemberClass1 p. MemberClass2 q. MemberClass3 | 20 minutes | 340 B |
| d | r. A | s. B | 10 minutes | 200 B |
| ... | ... | ... | ... | ... |

Table 2 shows an example of the memory allocation information table 40. The memory allocation information table 40 manages name of target set, root class, member class, average life time of root class and average area size of target set in a corresponding manner to one another.

The "name of target set" represents specific information of the target set 11 forming a key of each record. The target set 11 may be the constrained set 12 or the unconstrained set 13.

The "root class" represents one root class contained in the target set of the "names of target sets".

The "member class" represents one or more member classes contained in the target set of the "name of target set".

The "average life time of root class" represents an average life time as a result of execution concerning the "root class". The average life time is information for deciding whether the target set 11 of record is allocated to the internal heap 62 or the external heap 64 on the basis of comparison of a predetermined threshold and the average life time.

The "average area size of target set" represents an average area size allocated as a result of execution concerning the target set of the "name of target set". The average area size is used as an initial value of area size ensured in the external heap 64 when the average area size is allocated to the external heap 64.

TABLE 3

21 Set Definition Data

| Column Number | Contents |
|---|---|
| 1 | <target-set-definition> |
| 2 |   <target-set> |
| 3 |     <target-set-name>c</target-set-name> |
| 4 |     <root-class>p.RootClass</root-class> |
| 5 |   </target-set> |
| 6 |   <target-set> |
| 7 |     <target-set-name>d</target-set-name> |
| 8 |     <root-class>r.A</root-class> |
| 9 |   <target-set> |
| 10 | ... |
| 11 | </target-set-definition> |

Table 3 shows an example of the set definition data 21. The set definition data 21 is described in accordance with XML grammar (nesting structure of element tags).

1st to 11th lines represent target-set-definition element which is a root element.

2nd to 5th lines represent target-set element which is a child element of root element. target-set-name element in 3rd line represents name of the target set 11 and root-class element in 4th line represents name of root class of the target set 11.

6th to 10th lines represent target-set element which is a child element of root element in the same manner as 2nd to 5th lines.

TABLE 4

25 Set Root Class Table

| Name of Target Set | Root Class | Creation Time of Root Class | Release Time of Root Class | Area Size of Root Class | Member Class Candidate Table ID |
|---|---|---|---|---|---|
| c | p.RootClass | 2008/03/23 10:00 | 2008/03/28 10:20 | 100 B | #1 |
|   |   | 2008/03/23 12:00 | 2008/03/23 12:20 | 100 B | #2 |
|   |   | ... | ... | ... | ... |
| d | r.A | 2008/03/23 11:00 | 2008/03/23 11:10 | 50 B | #3 |
| ... | ... | ... | ... | ... | ... |

Table 4 shows an example of the set root class table 25. The set root class table 25 manages name of target set 11, root class contained in the target set 11, creation time of root class, release time of root class, area size of root class and member class candidate table ID in a corresponding manner to one another. The "member class candidate table ID" stores therein ID for specifying the set member class candidate table 26 (Table 5) in which a list of member classes utilized from corresponding root class is stored.

TABLE 5

| Member Class Candidate | Creation Time of Member Class Candidate | Release Time of Member Class Candidate | Area Size of Member Class Candidate |
|---|---|---|---|
| 26 Set Member Class Candidate Table (ID = #1) | | | |
| p. MemberClass1 | 2008/03/23 10:01 | 2008/03/23 10:20 | 10 B |
| p. MemberClass2 | 2008/03/23 10:01 | 2008/03/23 10:20 | 200 B |
| q. MemberClass3 | 2008/03/23 10:05 | 2008/03/23 10:14 | 30 B |

TABLE 5-continued

| Member Class Candidate | Creation Time of Member Class Candidate | Release Time of Member Class Candidate | Area Size of Member Class Candidate |
|---|---|---|---|
| 26 Set Member Class Candidate Table (ID = #2) | | | |
| p. MemberClass1 | 2008/03/23 12:01 | 2008/03/23 12:15 | 10 B |
| p. MemberClass2 | 2008/03/23 12:05 | 2008/03/23 12:15 | 200 B |
| q. MemberClass3 | 2008/03/23 12:10 | 2008/03/23 12:14 | 30 B |
| p. OtherClass | 2008/03/23 12:08 | 2008/03/23 12:10 | 100 B |
| 26 Set Member Class Candidate Table (ID = #3) | | | |
| ... | ... | ... | ... |

Table 5 shows an example of the set member class candidate table 26. The set member class candidate table 26 is composed of a plurality of divided tables for each member class candidate table ID of the set root class table 25 (Table 4). The set member class candidate table 26 manages member class candidate, creation time thereof, release time thereof and area size thereof in a corresponding manner to one another.

TABLE 6

31 Constraint Set Definition Data

| Column Number | Contents |
|---|---|
| 1 | <constrained-set-definition> |
| 2 | <constrained-set> |
| 3 | <constrained-set-name>a</constrained-set-name> |
| 4 | <root-class>x.RootClass</root-class> |
| 5 | <member-class>x.MemberClass1</member-class> |
| 6 | <member-class>x.MemberClass2</member-class> |
| 7 | <member-class>x.MemberClass3</member-class> |
| 8 | </constrained-set> |
| 9 | <constrained-set> |
| 10 | <constrained-set-name>b</constrained-set-name> |
| 11 | <root-class>y.A</root-class> |
| 12 | <member-class>y.B</member-class> |
| 13 | </constrained-set> |
| 14 | ... |
| 15 | </constrained-set-definition> |

Table 6 shows an example of the constraint set definition data 31. The constraint set definition data 31 has the same format as the set definition data 21 (Table 3). The constraint set definition data 31 includes definition information of the constrained set 12, while the set definition data 21 includes definition information of the target set 11 (constrained set 12 or unconstrained set 13).

1st to 15th lines represent constrained-set-definition element which is a root element.

2nd to 8th lines represent constrained-set element which is a child element of root element. Constrained-set-name element in 3rd line represents name of the constrained set 12 and root-class element of 4th line represents name of root class of the constrained set 12. Member-class elements in 5th to 7th lines represent names of member classes of the constrained set 12.

9th to 13th lines represent constrained-set element which is a child element of root element in the same manner as 2nd to 8th lines.

TABLE 7

36 constraint utilization information table

| Name of Constrained Set | Creation time of Root Class | Release Time of Root Class | Area Size of Constrained Set | Propriety of Constrained Set |
|---|---|---|---|---|
| a | 2008/03/23 10:00 | 2008/03/23 10:10 | 64 KB | Valid |
| b | 2008/03/23 10:20 | 2008/03/23 10:21 | 64 KB | Valid |
| b | 2008/03/23 10:30 | 2008/03/23 10:33 | 128 KB | Invalid |
| a | 2008/03/23 11:00 | 2008/03/23 11:10 | 64 KB | Valid |
| ... | ... | ... | ... | ... |

Table 7 shows an example of the constraint utilization information table 36. The constraint utilization information table 36 is mainly different from the set root class table 25 (Table 4) in that information stored in the constraint utilization information table 36 is limited to the constrained set 12, whereas information stored in the set root class table 25 is about the target set 11.

The constraint utilization information table 36 manages name of constrained set 12, creation time of root class contained in constrained set 12, release time of root class, area size of constrained set 12 and propriety of constrained set 12 in a corresponding manner to one another.

The "area size of constrained set 12" represents area size occupied by objects of root class and member class of the constrained set 12. The "propriety of constrained set" represents whether the utilization method of the constrained set 12 is valid or not.

TABLE 8

10 Execution Target Program

| Column Number | Contents |
|---|---|
| 1 | class Sample{ |
| 2 | private x.RootClass root; |
| 3 | void run( ) { |
| 4 | //creation of MemoryAllocator |
| 5 | MemoryAllocator ma =MemoryAllocator.newInstance( ); |
| 6 | //allocation of target set area |
| 7 | TargetSetArea area = ma.allocate("p.RootClass"); |
| 8 | //acquirement of root class |
| 9 | root=(x.RootClass)area.getRoot( ); |
| 10 | //any code utilizing target set |
| 11 | ... |
| 12 | //clear reference to root class before target set area is released |
| 13 | this.root=null; |
| 14 | //release of target set area |
| 15 | ma.release(area); |
| 16 | } |
| 17 | } |

Table 8 shows an example of the execution target program 10 utilizing the target set 11 (containing constrained set 12). This program is described in accordance with Java grammar.

5th line represents that newInstance method is utilized to create instance of memory allocator.

7th line represents that allocate method is utilized to allocate target set area containing root class designated by argument and start utilization of target set.

9th line represents that getRoot method is utilized to get root class of target set.

11th line represents that root class of gotten target set is utilized to execute any operation.

13th line represents that reference to root class of target set gotten in 9th line is cleared.

15th line represents that release method is utilized to release target set area designated by argument and end utilization of target set.

TABLE 9

Analysis Program

| Column Number | Contents |
|---|---|
| 1 | class Sample{ |
| 2 | private x.RootClass root; |
| 3 | void run( ) { |
| 4 | //creation of root class |
| 5 | root=new x.RootClass( ); |
| 6 | //any code |
| 7 | ... |
| 8 | } |
| 9 | } |

Table 9 shows an example of analysis program of the execution target program 10 utilizing the target set 11 (unconstrained set 13). This program is described in accordance with Java grammar.

Table 9 is now described paying attention to difference between Tables 8 and 9.

In 5th line, root class of target class 11 is created in internal heap 62. It is not specified that target set area is ensured and released.

TABLE 10

70 Set Area Management API

| Column Number | Contents |
|---|---|
| 1 | //Memory Allocator |
| 2 | public abstract class MemoryAllocator{ |
| 3 | //create instance of MemoryAllocator |
| 4 | public static MemoryAllocator newInstance( ) {...} |
| 5 | //allocate target set area |
| 6 | public abstract TargetSetArea allocate(String rootClass); |
| 7 | //release target set area |
| 8 | public abstract void release (TargetSetArea area) |
| 9 | } |
| 10 | //target set area |
| 11 | public interface TargetSetArea{ |
| 12 | //get root class |
| 13 | Object getRoot( ); |
| 14 | } |

Table 10 shows an example of set area management API 70. The set area management API 70 is utilized from the execution target program 10 of Table 8 and ensures and releases set area of the target set 11 (containing constrained set 12).

In 1st to 9th lines, MemoryAllocator class is declared. The MemoryAllocator class is memory allocator which ensures and releases set area of the target set 11 (containing constrained set 12). Instance of memory allocator is created by newInstance method of 4th line and set area containing root class designated by argument is allocated by allocate method of 6th line. Set area allocated by allocate method is released by release method of 8th line.

In 10th to 14th lines, TargetSetArea interface is declared. The targetSetArea interface prescribes set area accessed from MemoryAllocator class. getRoot method declared in 13th line is method of getting object of root class designated as argument upon calling of allocate method of 6th line.

Figure 6:
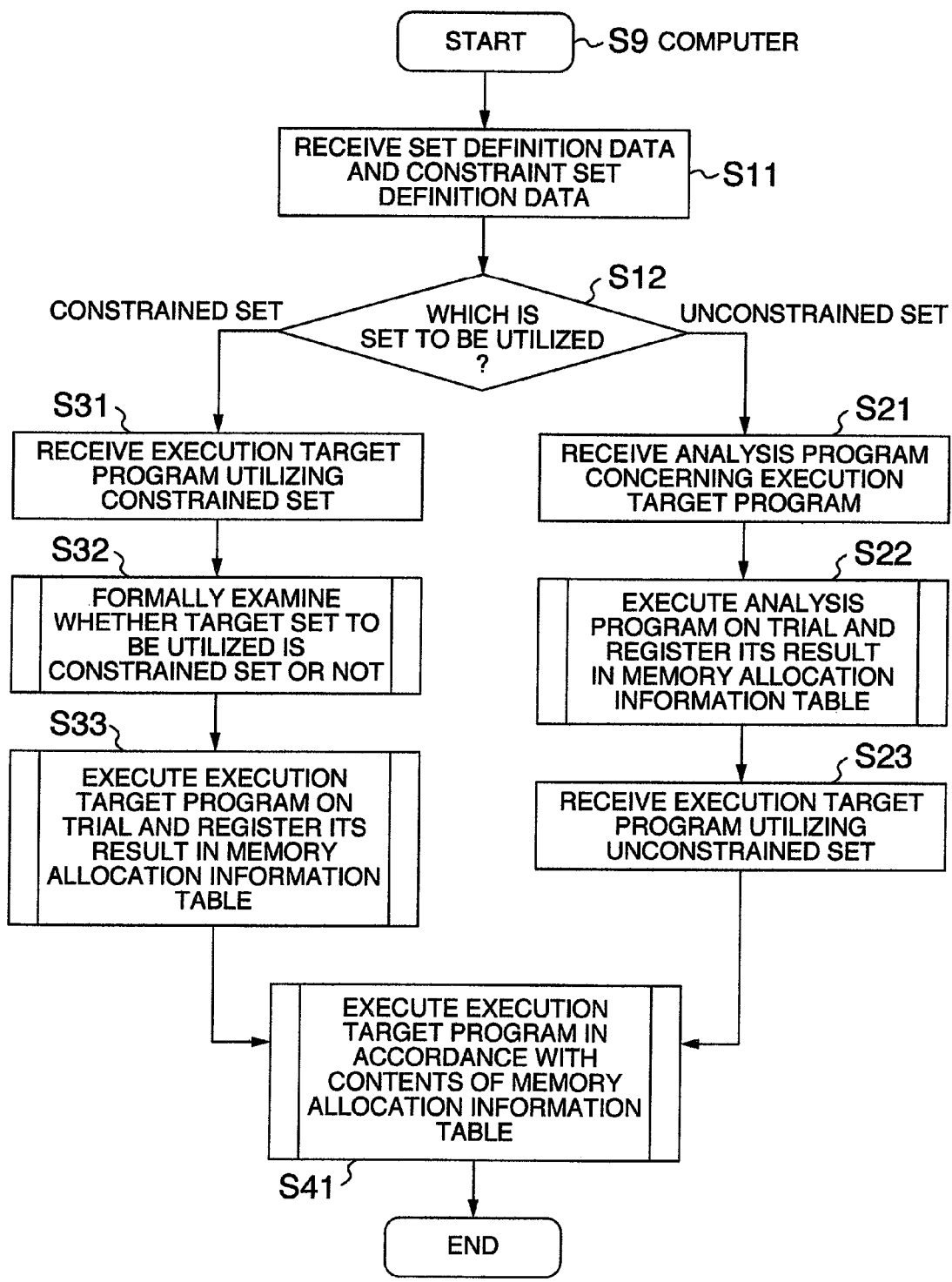
FIG. 6 is a flow chart showing processing executed by computer 9 according to the embodiment of the present invention.

FIG. 6 is a flow chart showing processing executed by the computer 9. The computer 9 calls up processing of flow charts shown in FIG. 7 et seq. as subroutine from the processing of the flow chart of FIG. 6.

In step S11, the computer 9 receives the set definition data 21 describing the unconstrained set 13 utilized from the execution target program 10 and the constraint set definition data 31 describing the constrained set 12 utilized from the execution target program 10 through the input unit 94.

In step S12, the computer 9 judges from the set definition data 21 and the constraint set definition data 31 received in step S11 whether the target set 11 to be utilized is the constrained set 12 or the unconstrained set 13. When the target set 11 is the constrained set 12 described in the constraint set definition data 31, the processing proceeds to step S31 and when it is the unconstrained set 13 described in the set definition data 21, the processing proceeds to step S21.

In step S21, the computer 9 receives analysis program concerning the execution target program 10. The target set 11 to be utilized in the analysis program of step S21 is the same as that in the execution target program 10 inputted in step S23. The analysis program is described without being aware of the target set 11 to be utilized. On the other hand, description representing the result of trial execution (in step S22 described later) of the analysis program is added to the execution target program 10 and description to the effect that the set area of the target set 11 is ensured and released by the set area management API 70 is added thereto.

Figure 11:
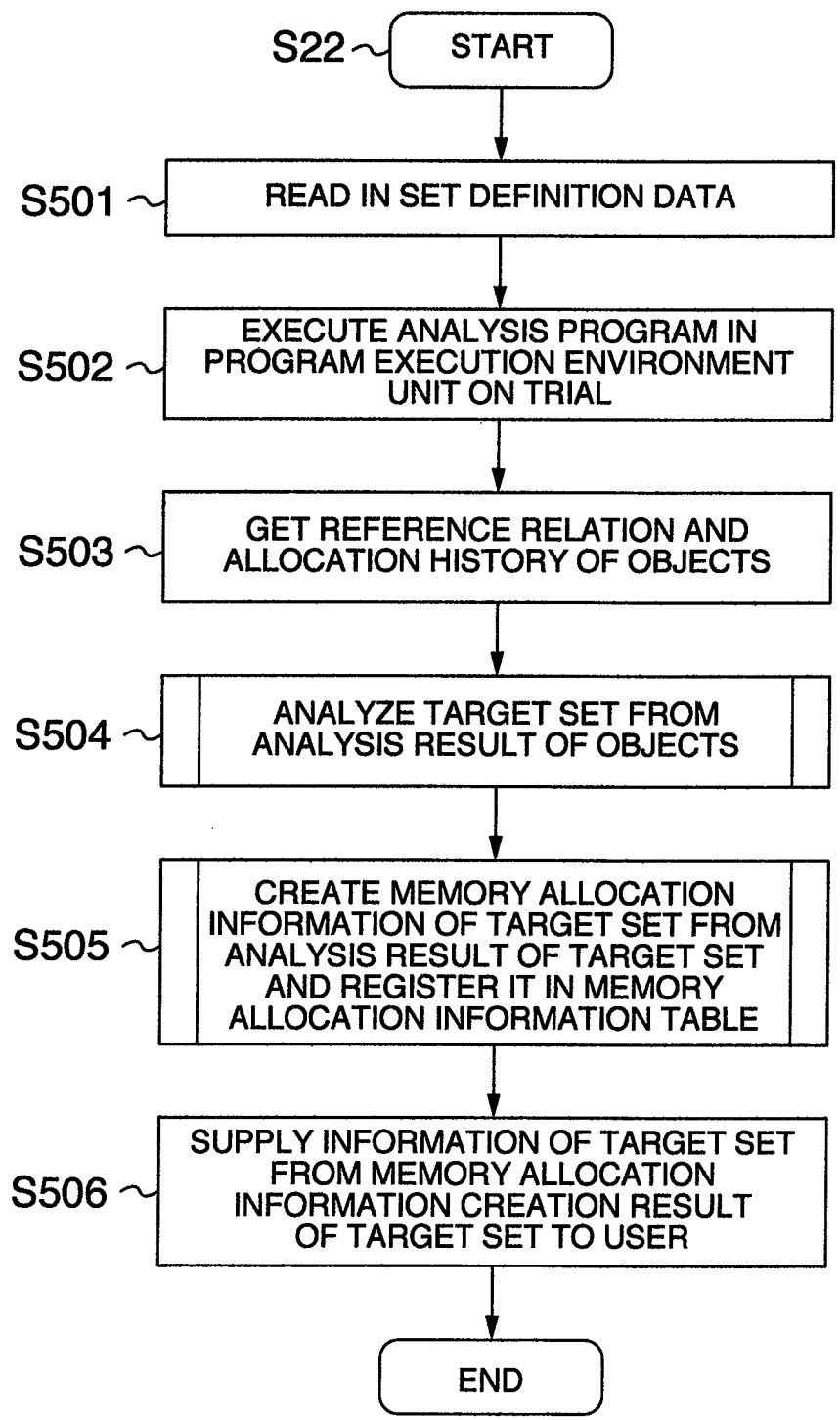
FIG. 11 is a flow chart showing trial execution processing of program executed by set trial execution unit 22 according to the embodiment of the present invention.

In step S22, the set trial execution unit 22 executes the analysis program (on trial) and registers its result in the memory allocation information table 40. Accordingly, the set trial execution unit 22 executes processing shown in a flow chart of FIG. 11. In the processing of FIG. 11 et seq., the set trial execution unit 22 specifies whether the target set 11 containing root class designated by the set definition data 21 inputted in step S11 exists in the analysis program inputted in step S21 or not.

In step S23, the computer 9 receives the execution target program 10 utilizing the unconstrained set 13. The execution target program 10 is a program in which specified memory management of the unconstrained set 13 by the set area management API 70 is added to the analysis program.

Creation of root class of the analysis program (5th line of Table 9) is changed to allocation (allocate in 7th line of Table 8) of target set area of the unconstrained set 13 specified from trial execution result (described later in step S506 of FIG. 11) of the analysis program and getting of root class (getRoot in 5th line of Table 8).

Clearing of reference to root class (13rd line of Table 8) and release of allocated target set area (release in 15th line of Table 8) are added next to any operation of the unconstrained set 13 (7th line of Table 9).

In step S31, the computer 9 receives the execution target program 10 utilizing the constrained set 12.

In step S32, the constraint format examination unit 32 formally examines whether the target set 11 to be utilized by the execution target program 10 inputted in step S31 is the constrained set 12 or not as represented by the constraint set definition data 31 inputted in step S11. Accordingly, the constraint format examination unit 32 executes processing shown by the flow chart of FIG. 15.

In step S33, the constraint trial execution unit 33 executes the execution target program 10 passing the formal examination in step S32 (on trial) and registers its result in the memory allocation information table 40. Therefore, the constraint trial execution unit 33 executes processing shown by the flow chart of FIG. 18.

In step S41, the program execution unit 50 executes (operates) the execution target program 10 in accordance with the contents of the memory allocation information table 40 registered in step S22 or S33. Accordingly, the program execution unit 50 executes processing shown by the flow chart of FIG. 7. At this time, the memory allocation unit 51 of the program execution unit 50 reads the life period (life time) of the target set 11 (constrained set 12 and unconstrained set 13) utilized from the execution target program 10 from the memory allocation information table 40 to compare it with predetermined threshold so that the memory allocation unit 51 judges whether the target set 11 has long or short life. When it has long life, the target set area is allocated to the external heap 64 and the target set 11 is disposed in the target set area, whereas when it has short life, the target set 11 is disposed in the internal heap 62.

In the processing of FIG. 6, the objects having heavy processing load out of the objects described below can be evacuated into the external heap 64 to thereby suppress reduction in processing performance of the computer 9.

Objects (steps S21, S22 and S23) utilized from existing program (analysis program)

Objects (steps S31, S32 and S33) utilized from new program (execution target program 10)

In the processing of FIG. 6, the set definition data 21 and the constraint set definition data 31 are received in step S11 and processing is branched on the basis of the set to be utilized in step S12, so that the single computer 9 is adapted to select two kinds of target sets 11 (unconstrained set 13 and constrained set 12) to be handled. On the other hand, the single computer 9 may be structured to handle one kind of target set 11 exclusively. In this case, input (step S11) of the constraint set definition data 31 and branch thereof (step S12) can be omitted.

Figure 7:
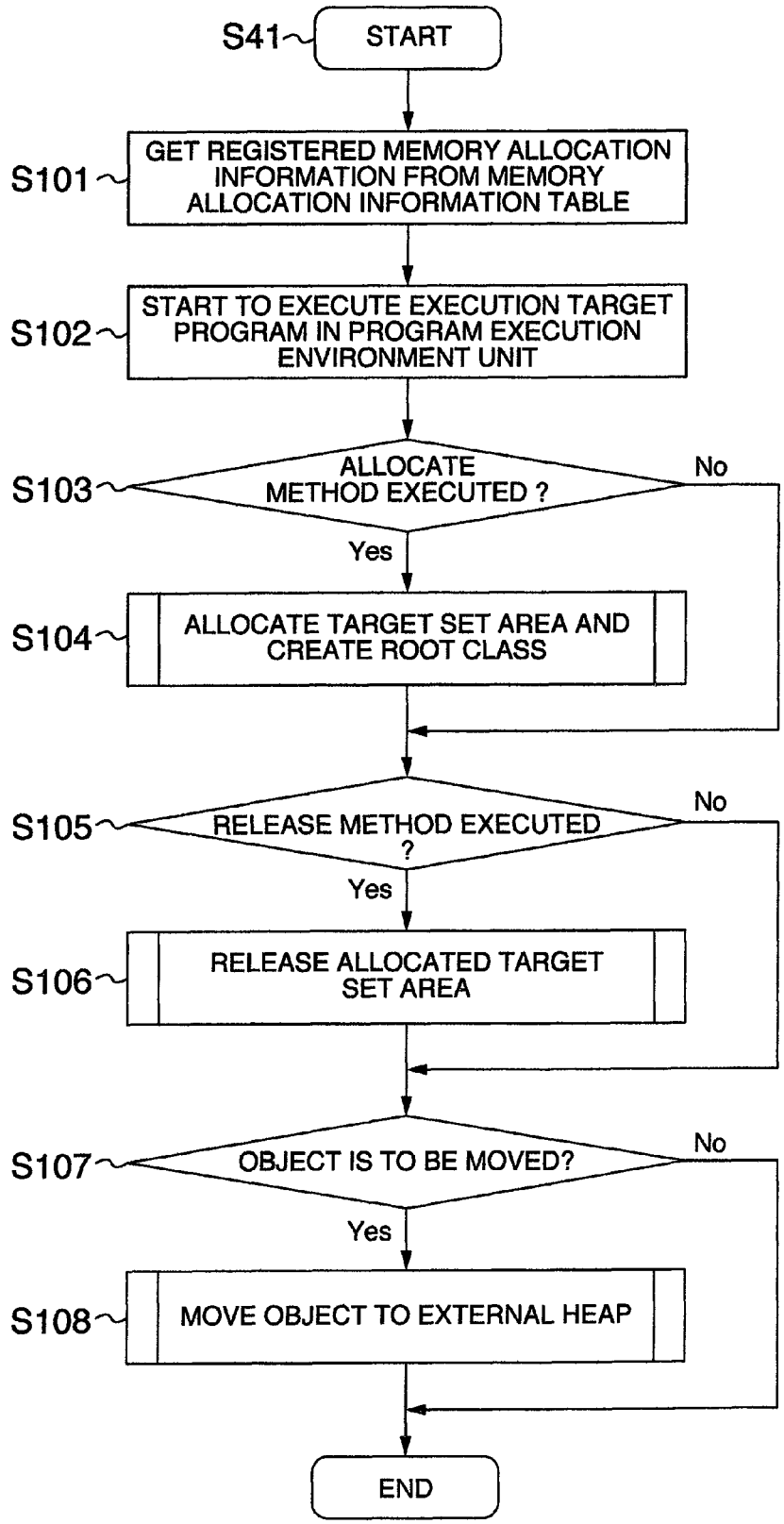
FIG. 7 is a flow chart showing processing of execution target program 10 operated by program execution unit 50 according to the embodiment of the present invention.

FIG. 7 is a flow chart showing processing of the execution target program 10 operated or executed by the program execution unit 50. The processing of the flow chart of FIG. 7 is called up from the processing of step S41 of FIG. 6. The execution target program 10 may be a program utilizing the constrained set 12 or a program utilizing the unconstrained set 13.

In step S101, memory allocation information registered in steps S22 and S33 is gotten from the memory allocation information table 40.

In step S102, the execution target program 10 is started to be executed in the program execution environment unit 60.

In step S103, when allocate method is executed by the execution target program 10 being executed, the processing proceeds to step S104.

Figure 8:
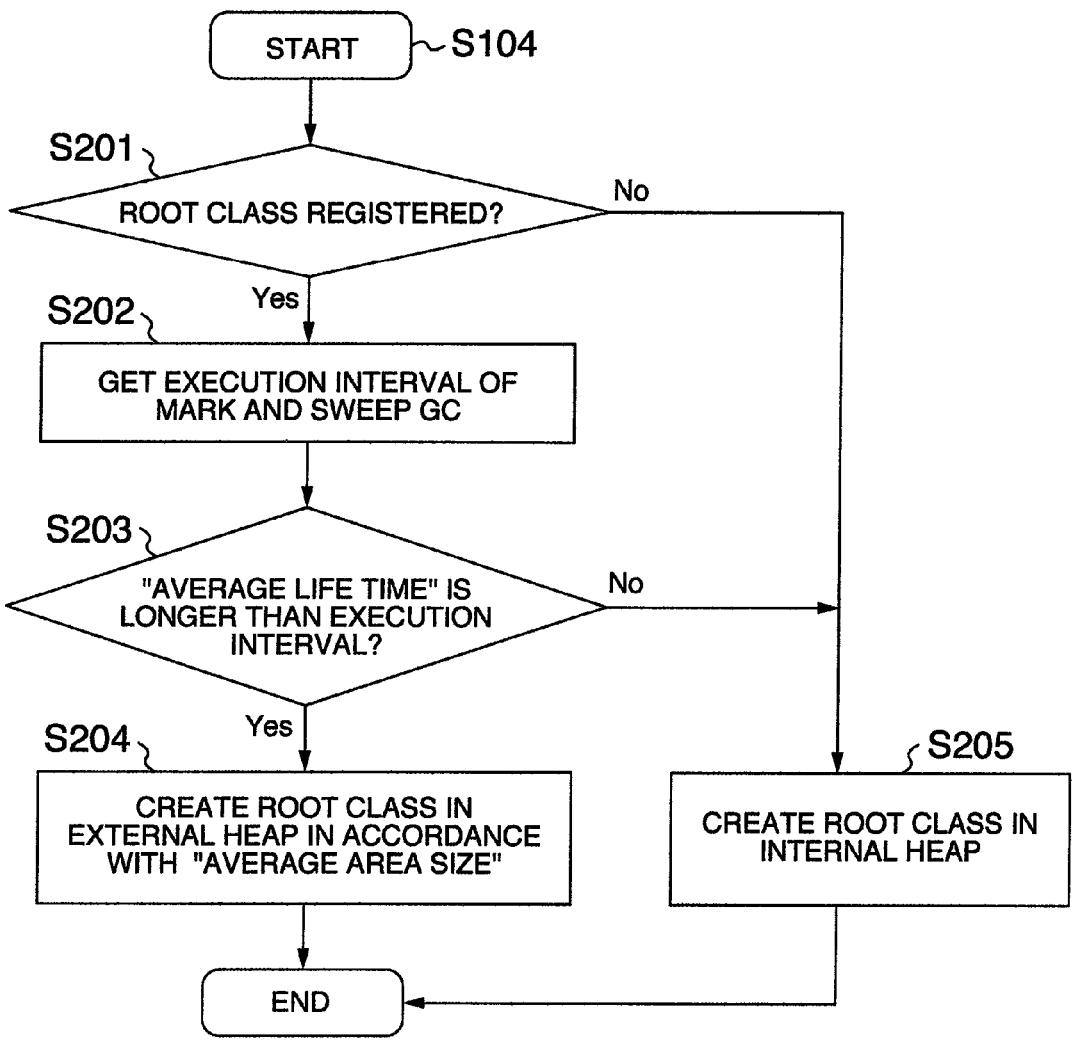
FIG. 8 is a flow chart showing area allocation processing of target set 11 executed by root class disposition unit 52 according to the embodiment of the present invention.

In step 104, the target set area is allocated and root class is created in the target set area. That is, processing of FIG. 8 is called up using as argument the name of root class delivered by argument of allocate method. In the processing of FIG. 8, the program execution unit 50 instructs the root class disposition unit 52 to create root class. When the root class disposition unit 52 receives the instruction, the root class disposition unit 52 allocates the target set area to the external heap 64 when the target set 11 has long life and creates root class in the target set area. When the target set 11 has short life, the root class disposition unit 52 creates root class in the internal heap 62.

In step S105, when release method of the execution target program 10 is executed, the processing proceeds to step S106.

Figure 9:
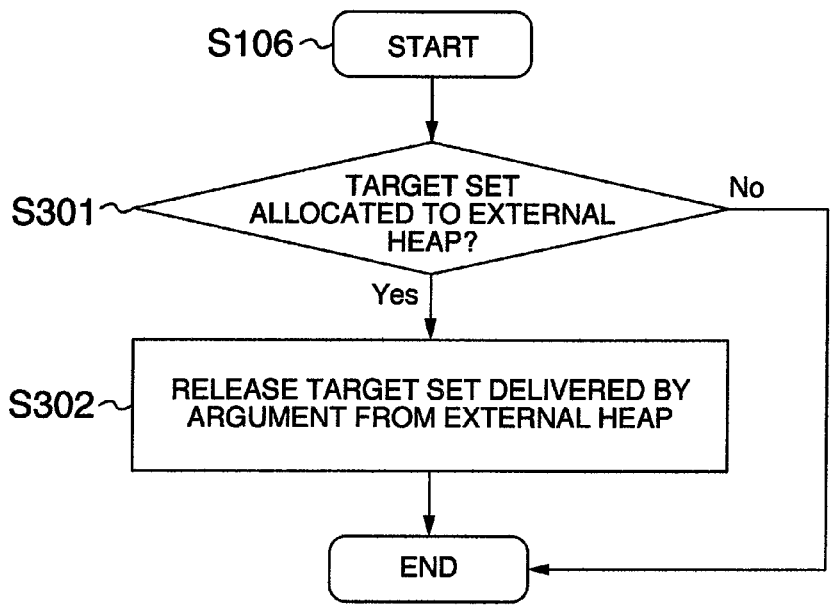
FIG. 9 is a flow chart showing area release processing of target set 11 executed by root class disposition unit 52 according to the embodiment of the present invention.

In step S106, the target set area allocated by allocate method is released. That is, processing of FIG. 9 is called up using as argument the target set area delivered by argument of release method and allocated in step S104. The program execution unit 50 instructs the root class disposition unit 52 to release the target set area in FIG. 9. The root class disposition unit 52 releases the target set area allocated to the external heap 64 in response to the instruction.

In step S107, when object in New area of the internal heap 62 becomes object to be moved to Old area by processing of copying GC unit 66 of the program execution environment unit 60, the processing proceeds to step S108.

Figure 10:
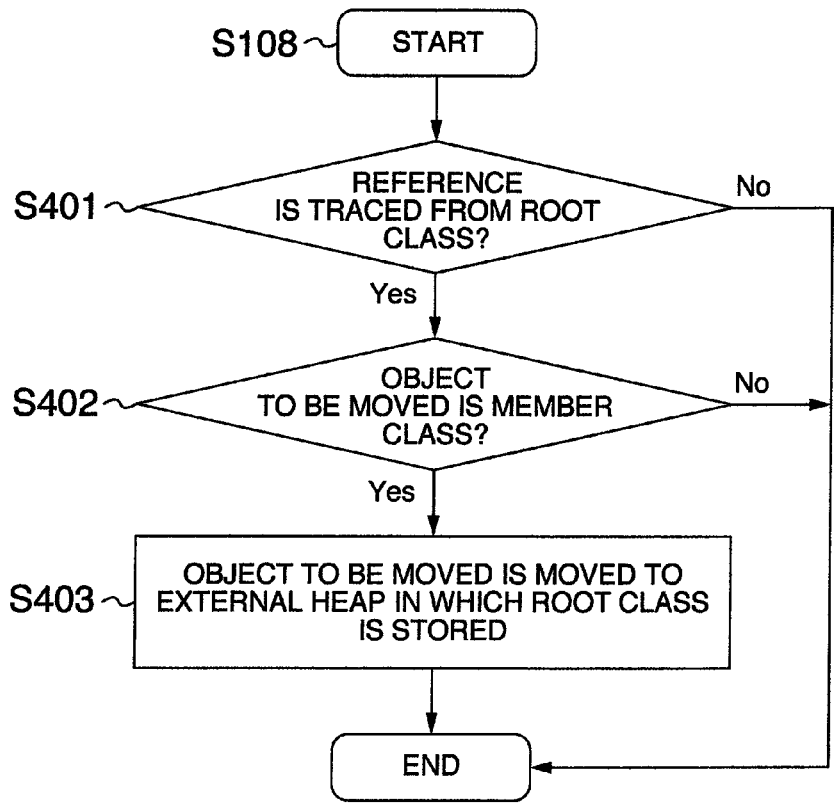
FIG. 10 is a flow chart showing movement processing of object executed by member class disposition unit 53 according to the embodiment of the present invention.

In step S108, the object of member class to be moved in step S107 is moved to target set area allocated to the external heap 64 in step S104. That is, processing of FIG. 10 is called up using the object to be moved as argument. The program execution unit 50 instructs the member class disposition unit 53 to move the object of member class to the target set area allocated to the external heap 64 when the target set has long life.

FIG. 8 is a flow chart showing area allocation processing of the target set 11 executed by the root class disposition unit 52. The processing of the flow chart is a subroutine called up from the processing of step S104 to be executed and name of root class is delivered as its argument.

In step S201, it is judged whether the name of root class delivered as argument is registered in root class column of the memory allocation information table 40 gotten in step S101 or not. When it is registered (Yes of step S201), processing subsequent to step S202 is executed using record of the memory allocation information table 40 as registration record.

In step S202, execution interval of Mark and Sweep GC is gotten from the Mark and Sweep GC unit 67.

In step S203, it is judged whether the "average life time" of registration record is equal to or longer than the gotten execution interval of Mark and Sweep GC or not. When the judgment of step S203 is satisfied, the processing proceeds to step S204.

In step S204, the target set area is allocated in the external heap 64 by means of the external heap processing unit 63 in accordance with "average area size of target set" of registration record and root class delivered by argument is created in the target set area.

In step S205, when judgment in steps S201 or S203 is No, the internal heap processing unit 61 is used to create root class delivered by argument in the internal heap 62.

FIG. 9 is a flow chart showing area release processing of the target set 11 executed by the root class disposition unit 52. The processing of the flow chart is a subroutine called up from the processing of step S106 to be executed and the target set 11 to be released is delivered as its argument.

In step S301, it is judged whether the target set 11 delivered by argument is allocated to the external heap 64 or not (allocated to the internal heap 62). When judgment in step S301 is No, the target set 11 allocated to the internal heap 62 is released by the GC processing unit 65 in accordance with the algorithm of GC. When judgment in step S301 is satisfied, the processing proceeds to step S302.

In step S302, the external heap processing unit 63 is used to release the target set area in which the target set 11 delivered by argument is disposed from the external heap 64.

FIG. 10 is a flow chart showing movement processing of object executed by the member class disposition unit 53. The processing of the flow chart is a subroutine called up from the processing of step S108 to be executed and object to be moved is delivered as its argument.

In step S401, whether reference from object of root class disposed in external heap 64 by allocate method to object to be moved delivered by argument is traced is inquired to the copying GC unit 66. When judgment in step S401 is satisfied, the processing proceeds to step S402.

In step S402, it is judged whether object to be moved delivered by argument is object of member class of target set containing root class of step S401 or not. When judgment in step S402 is satisfied, the processing proceeds to step S403.

In step S403, the object to be moved delivered by argument is moved to target set area in the external heap 64 in which object of root class of step S401 is stored.

FIG. 11 is a flow chart showing trial execution processing of program executed by the set trial execution unit 22. The processing of the flow chart is a subroutine called up from the processing of step S22 of FIG. 6.

In step S501, the set trial execution unit 22 reads in set definition data 21 inputted in step S11.

In step S502, the set object analysis unit 23 executes analysis program of step S21 in the program execution environment unit 60 on trial.

In step S503, the set object analysis unit 23 gets reference relation of all objects utilized in the analysis program executed on trial through reference information getting unit 69 and gets allocation history of all objects utilized through object information getting unit 68.

First of all, reference relation of objects described below is gotten from FIG. 4A.
  Reference "RootClass→MemberClass1"
  Reference "RootClass→MemberClass2"
  Reference "MemberClass1→MemberClass3"
  Reference "MemberClass2→OtherClass2"
  Reference "OtherClass1→OtherClass2"

FIG. 4B shows area size, creation time and release time of all objects (RootClass, MemberClass1, MemberClass2, MemberClass3, OtherClass1 and OtherClass2) as allocation history of objects to be gotten.

In step S504, the set analysis unit 24 analyzes the target set 11 on the basis of analysis result of objects by the set object analysis unit 23. Accordingly, a subroutine shown in FIG. 12 is called up.

Figure 14:
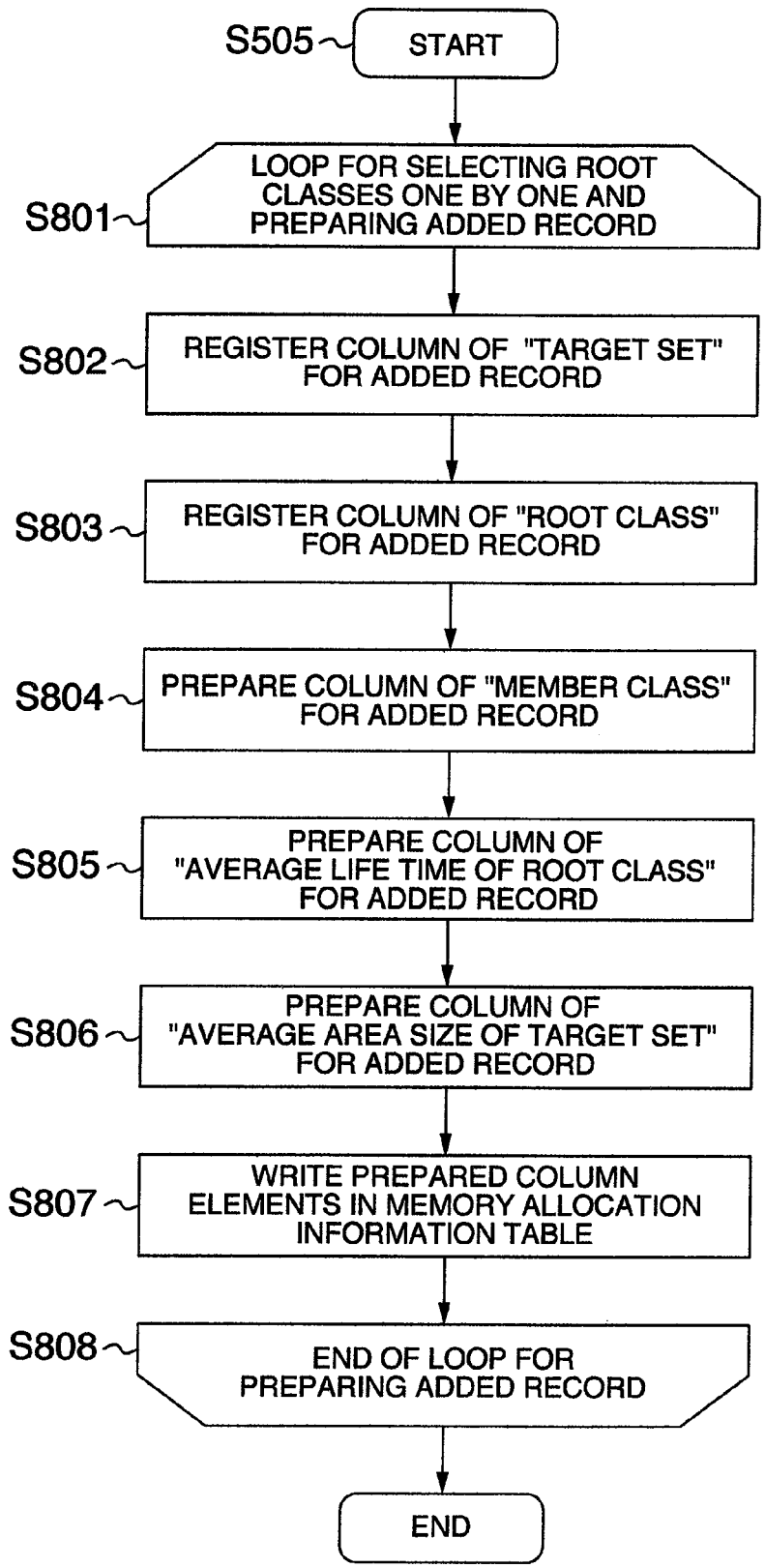
FIG. 14 is a flow chart showing registration processing of memory allocation information table 40 executed by set memory allocation information creation unit 27 according to the embodiment of the present invention.

In step S505, the set memory allocation information creation unit 27 creates memory allocation information of the target set 11 on the basis of analysis result of the target set 11 by the set analysis unit 24 and registers the memory allocation information in memory allocation information table 40. Accordingly, a subroutine shown in FIG. 14 is called up.

In step S506, the set trial execution unit 22 supplies "target set", "root class" and "member class" registered in the memory allocation information table 40 from creation result of memory allocation information by the set memory allocation information creation unit 27 to the user.

Figure 12:
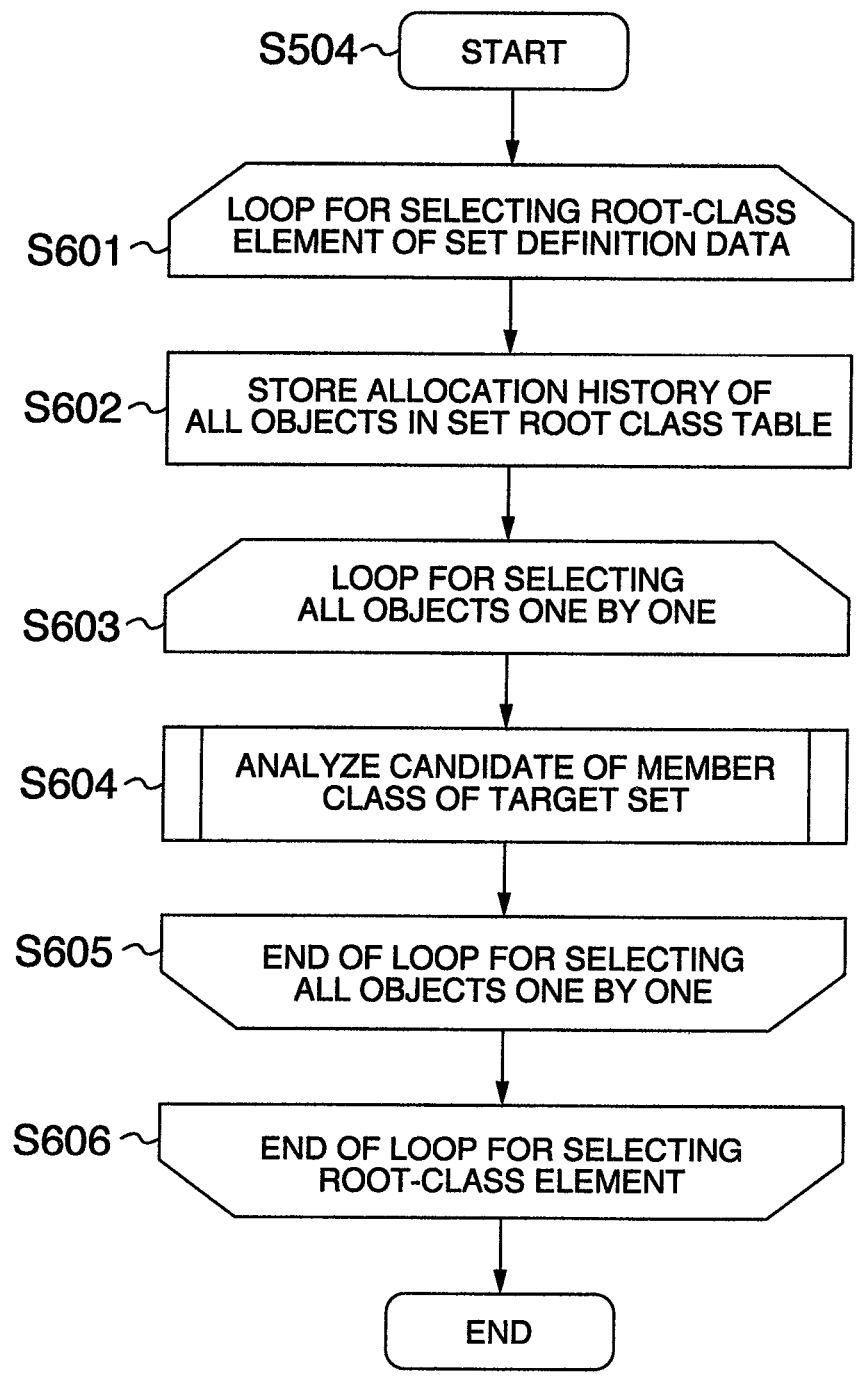
FIG. 12 is a flow chart showing analysis processing of target set 11 executed by set analysis unit 24 according to the embodiment of the present invention.

FIG. 12 is a flow chart showing analysis processing of the target set 11 executed by the set analysis unit 24. The processing of the flow chart is a subroutine called up from the processing of step S504.

In steps S601 to S606, the set analysis unit 24 executes loop processing for selecting root-class element in target-set elements with reference to set definition data 21 inputted in step S11.

In step S602, allocation history of all objects created from root class defined by root-class element selected by loop processing is selected ("RootClass" in FIG. 4) from allocation history of object gotten in step S503 and the selected information is stored in column concerning root class of set root class table 25.

In steps S603 to S605, loop processing for selecting all objects of step S602 one by one is executed.

In step S604, candidate of member class of the target set for objects selected in loop processing starting from step S603 is analyzed. Accordingly, subroutine shown in FIG. 13 is called up.

Figure 13:
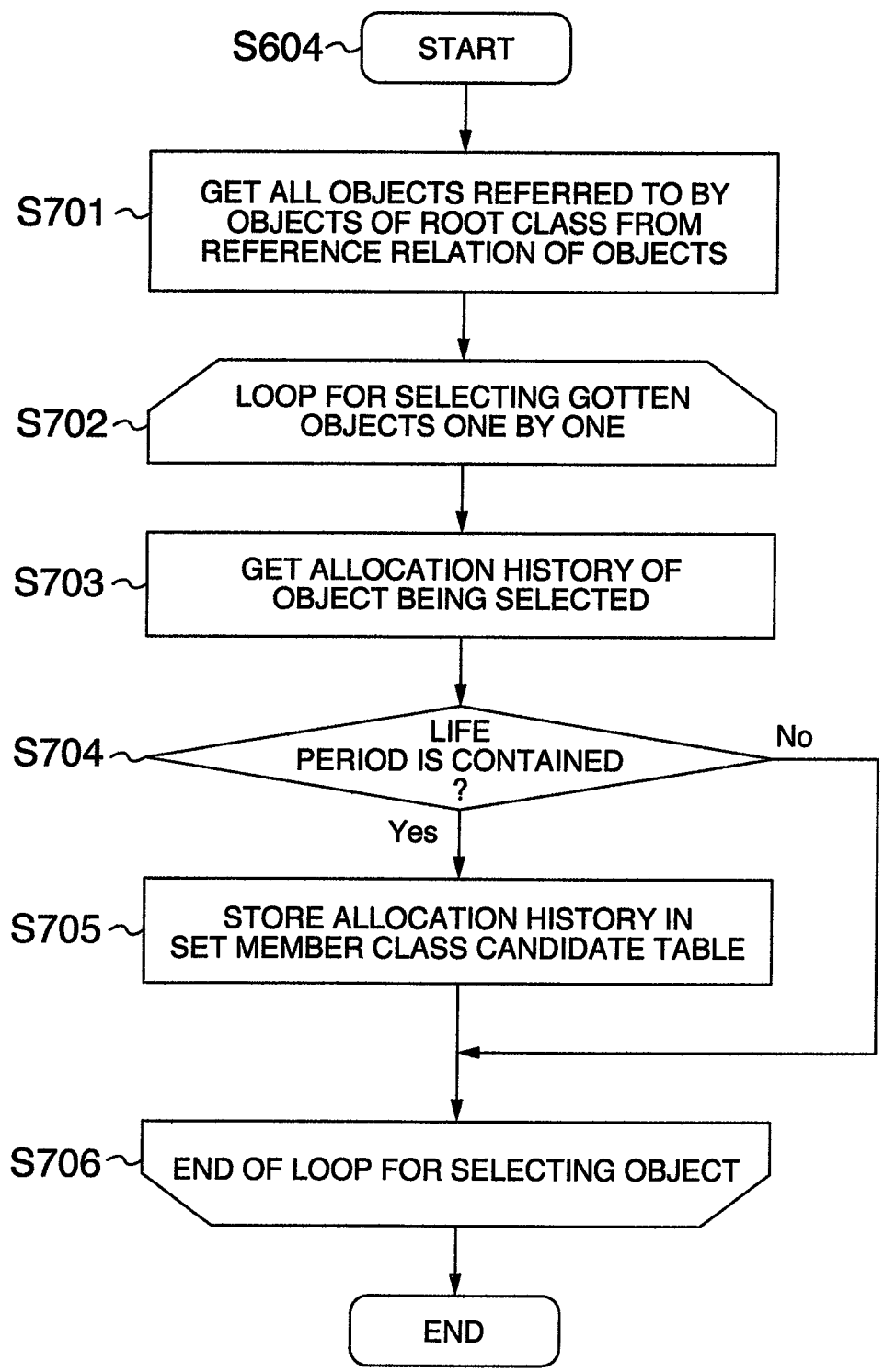
FIG. 13 is a flow chart showing analysis processing of member class candidate of target set executed by set analysis unit 24 according to the embodiment of the present invention.

FIG. 13 is a flow chart showing analysis processing of member class candidate of the target set executed by the set analysis unit 24. The processing of the flow chart is a subroutine called up by the processing of step S604.

In step S701, the set analysis unit 24 gets all objects referred to by objects of root class selected in loop processing of steps S603 to S605 from reference relation of objects gotten in step S503. The set analysis unit 24 gets not only objects referred directly to by objects of root class but also all objects traced from objects of root class. In example shown in FIG. 4, the set analysis unit 24 gets "MemberClass1, MemberClass2, MemberClass3 and OtherClass2" from reference information getting unit 69.

In steps S702 to S706, loop processing for selecting all objects gotten in step S701 one by one is executed.

In step S703, allocation history of object being selected in loop processing of steps S702 to S706 is gotten from allocation history of objects gotten in step S503.

In step S704, it is judged whether the life period represented by creation time and release time of the gotten allocation history is contained within the life period represented by creation time and release time of root class selected in loop processing of steps S603 to S605 or not. When judgment of step S704 is satisfied, the processing proceeds to step S705.

In step S705, allocation history of object being selected in loop processing of steps S702 to S706 is stored in column of member class candidate of the set member class candidate table 26.

For example, allocation history of MemberClass1, MemberClass2 and MemberClass3 contained (Yes of step S704) in life period of RootClass of FIG. 4 is stored in set member class candidate table 26 (ID=#1) as candidate of member class.

On the other hand, allocation history of OtherClass2 which is not contained (No of S704) within the life time of RootClass of FIG. 4 is not stored in set member class candidate table 26.

Furthermore, OtherClass2 is stored in another set member class candidate table 26 (e.g. ID=#2) when root class except RootClass of FIG. 4 is selected in steps S603 to S605 and OtherClass2 is contained within the life period of at least one root class out of the selected root class.

FIG. 14 is a flow chart showing registration processing of the memory allocation information table 40 executed by the set memory allocation information processing unit 27. The processing of the flow chart is a subroutine called up from the processing of step S505.

In steps S801 to 808, loop processing for selecting root classes of the set root class table 25 prepared in analysis processing (step S504) of target set 11 by the set analysis unit 24 one by one and preparing record added to the memory allocation information table 40 for each selected root class is executed.

In step S802, target set to which selected root class belongs is registered in column of "target set" for added record.

In step S803, selected root class is registered in column of "root class" for added record.

In step S804, column of "member class" for added record is prepared with reference to set member class candidate table 26. Concretely, processing of the following items (1) to (3) is executed.

(1) Column of "root class" of the set root class table 25 is searched for selected root class.
(2) All of "member class candidate table IDs" of the set root class table 25 contained in the searched record are extracted.
(3) All of elements stored in column of "member class candidate" in all of the set member class candidate tables 26 having member class candidate table ID coincident with extracted "member class candidate table ID" are extracted as member class for added record. (All of elements stored in column of "member class candidate" in any set member class candidate table 26 having member class candidate table ID coincident with extracted "member class candidate table ID" may be extracted as member class for added record.)

In step S805, column of "average life time of root class" for added record is prepared. Concretely, difference between "creation time of member class candidate" and "release time of member class candidate" corresponding thereto for each set contained in record searched in item (1) of step S804 is calculated as life time for each set to calculate an average value thereof as an average life time of selected root class.

In step S806, column of "average area size of target set" for added record is prepared. That is, average area size of area size of target set is calculated from size of selected root class and size of extracted member class. Concretely, size of root class of target set is read out from column of "area size of root class" of set root class table 25 and size of member class of target set is read out from column of "area size of member class candidate" of set member class candidate table 26 for each target set and both of them are added to thereby calculate the area size of target set. An average value of the area sizes of target sets calculated for each target set is calculated.

In step S807, column elements for added records prepared in steps S802 to S806 are written in the memory allocation information table 40.

Figure 15:
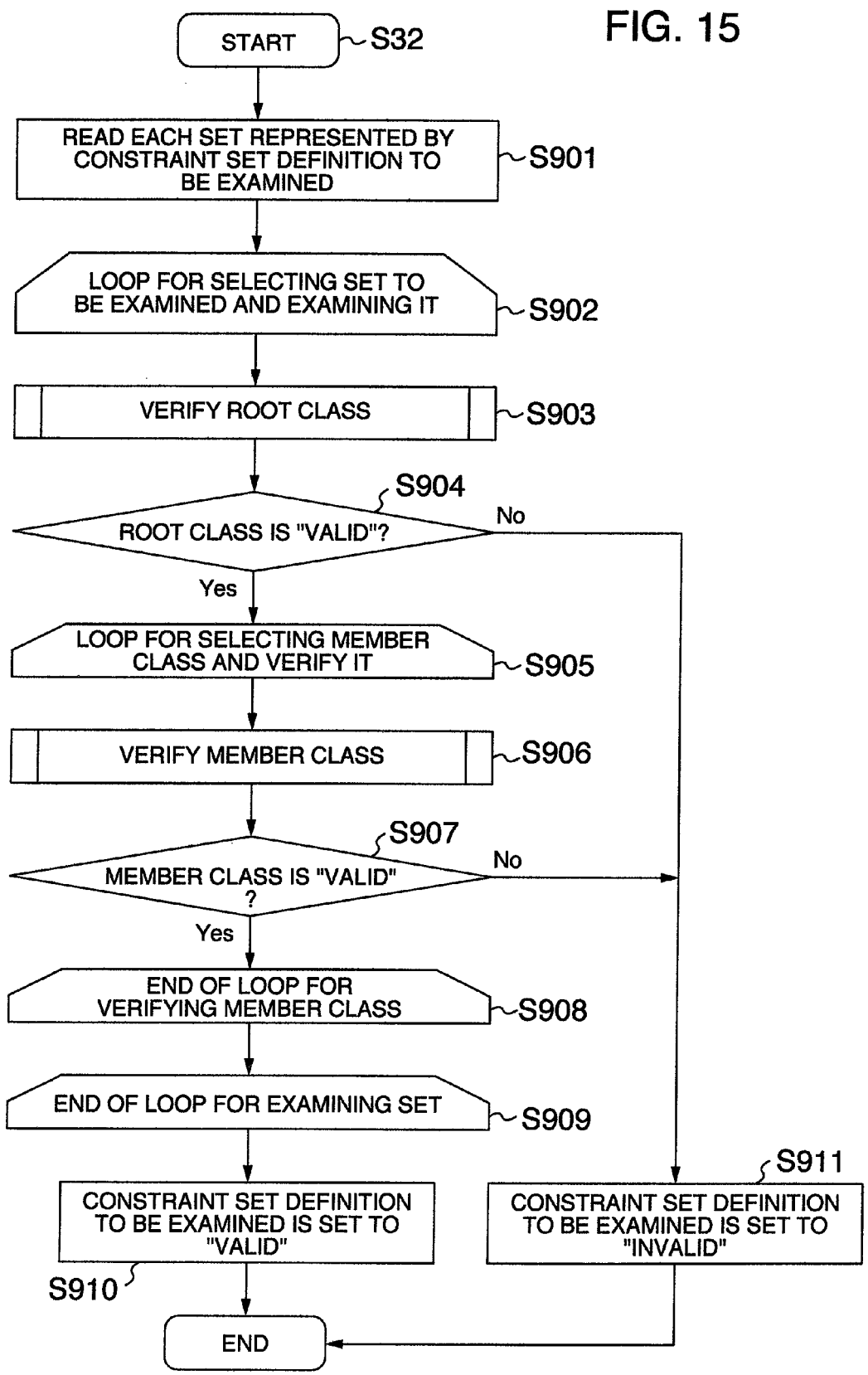
FIG. 15 is a flow chart showing processing executed by constraint format examination unit 32 to examine whether constraint format (all of 1st to 5th rules) of constrained set 12 is satisfied or not according to the embodiment of the present invention.

FIG. 15 is a flow chart showing processing executed by the constraint format examination unit 32 to examine whether constraint format of the constrained set 12 (all of first to fifth rules) is satisfied or not. The processing of the flow chart is a subroutine called up by the processing of step S32 of FIG. 6 and the constraint set definition data 31 (inputted in step S11) indicating set utilized from the execution target program 10 is argument-designated as constraint set definition data 31 to be examined.

In step S901, each set represented by the constraint set definition data 31 to be examined is read.

In steps S902 to S909, loop processing for selecting set to be examined from the read sets one by one and examining the set is executed.

In step S903, subroutine (FIG. 16) for designating root class of the set to be examined as root class to be examined and verifying the root class is called up.

In step S904, it is judged that verification result of root class in step S903 is "valid" or not. When judgment of step S904 is satisfied, the processing proceeds to step S905 and when it is not satisfied, the processing proceeds to step S911.

In steps S905 to S908, loop processing for selecting member class of set to be examined from the constraint set definition data 31 one by one and verifying the member class is executed.

In step S906, the selected member class is designated as member class to be examined and subroutine (FIG. 17) for verifying the member class is called up.

In step S907, it is judged whether the verification result of member class of step S906 is "valid" or not. When judgment of step S907 is satisfied, the processing proceeds to step S908 and when it is not satisfied, the processing proceeds to step S911.

In step S910, when all of verification results of root class are "valid" (Yes of step S904) and all of verification results of member class are "valid" (Yes of step S907) for all sets to be examined, the constraint set definition data 31 to be examined is set to "valid" and the processing is ended.

In step S911, when at least one of verification results of root class and verification results of member class is "invalid" (No of steps S904 and S907) for one or more sets of sets to be examined, the constraint set definition data 31 to be examined is set to "invalid" and the processing is ended.

The set to be examined judged to be all "valid" in judgment of step S904 or S907 is the constrained set 12. On the other hand, the set to be examined judged to be "invalid" even once in judgment of step S904 or S907 is the unconstrained set 13 or the set except target set 11.

Figure 16:
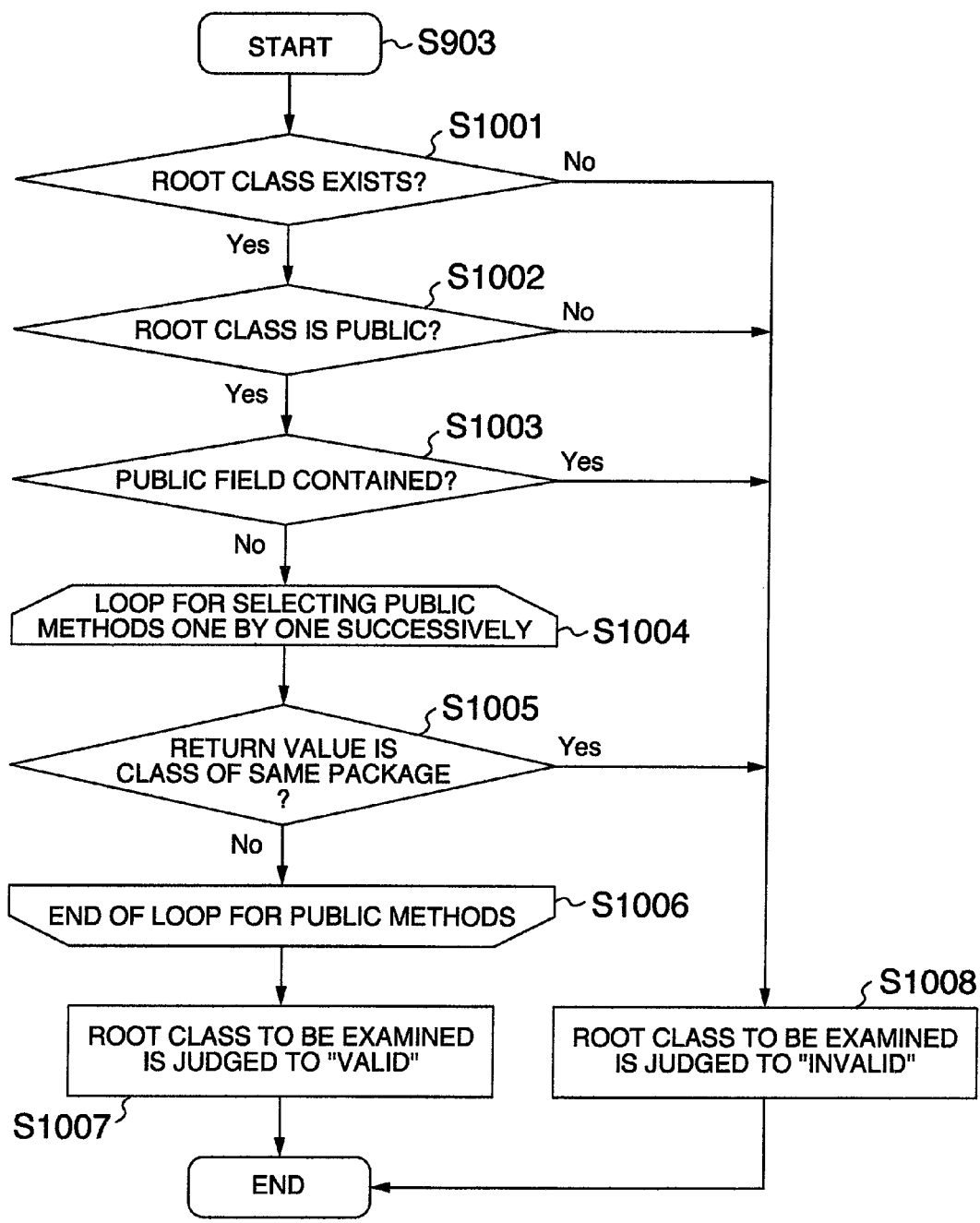
FIG. 16 is a flow chart showing processing executed by constraint format examination unit 32 to examine whether root class satisfies constraint format or not according to the embodiment of the present invention.

FIG. 16 is a flow chart showing processing executed by the constraint format examination unit 32 to examine whether the root class satisfies the constraint format or not. The processing of the flow chart is a subroutine called up by the processing of step S903.

In step S1001, the constraint format examination unit 32 judges whether program of the root class to be examined defined in constraint set definition data 31 exists in the execution target program 10 inputted in step S31 or not. When judgment of step S1001 is satisfied, the processing proceeds to step S1002 and when it is not satisfied, the processing proceeds to step S1008.

In step S1002, it is judged whether the program of root class to be examined, which exists in the execution target program 10 inputted in step S31 is public class or not. When judgment of step S1002 is satisfied, the processing proceeds to step S1003 and when it is not satisfied, the processing proceeds to step S1008.

In step S1003, it is judged whether the program of root class to be examined contains public field or not. When judgment of step S1003 is satisfied, the processing proceeds to step S1008 and when it is not satisfied, the processing proceeds to step S1004.

In steps S1004 to S1006, loop processing for selecting public methods of the program of root class to be examined successively one by one is executed. After this loop processing is ended, the processing proceeds to step S1007.

In step S1005, it is judged whether return value of the selected public method is class of the same package as root class to be examined or not. When judgment of step S1005 is satisfied, the processing proceeds to step S1008 and when it is not satisfied, the processing proceeds to step S1006.

In step S1007, it is judged that the root class to be examined is "valid".

In step S1008, it is judged that the root class to be examined is "invalid".

As an example contrary to the fourth rule of the constrained set, when the return value of the selected public method is package different from the root class (No of step S1005) and super class of member class and the public method returns the member class as return value, it is contrary to the fourth rule although it may be judged to be "valid" as exceptional processing. The propriety contrary to the fourth rule in this case is verified by the constraint root class disposition unit 34 (described in step S1404 of FIG. 20 later) of the constraint trial execution unit 33 when Java program utilizing the constrained set in step S33 is executed on trial.

Figure 17:
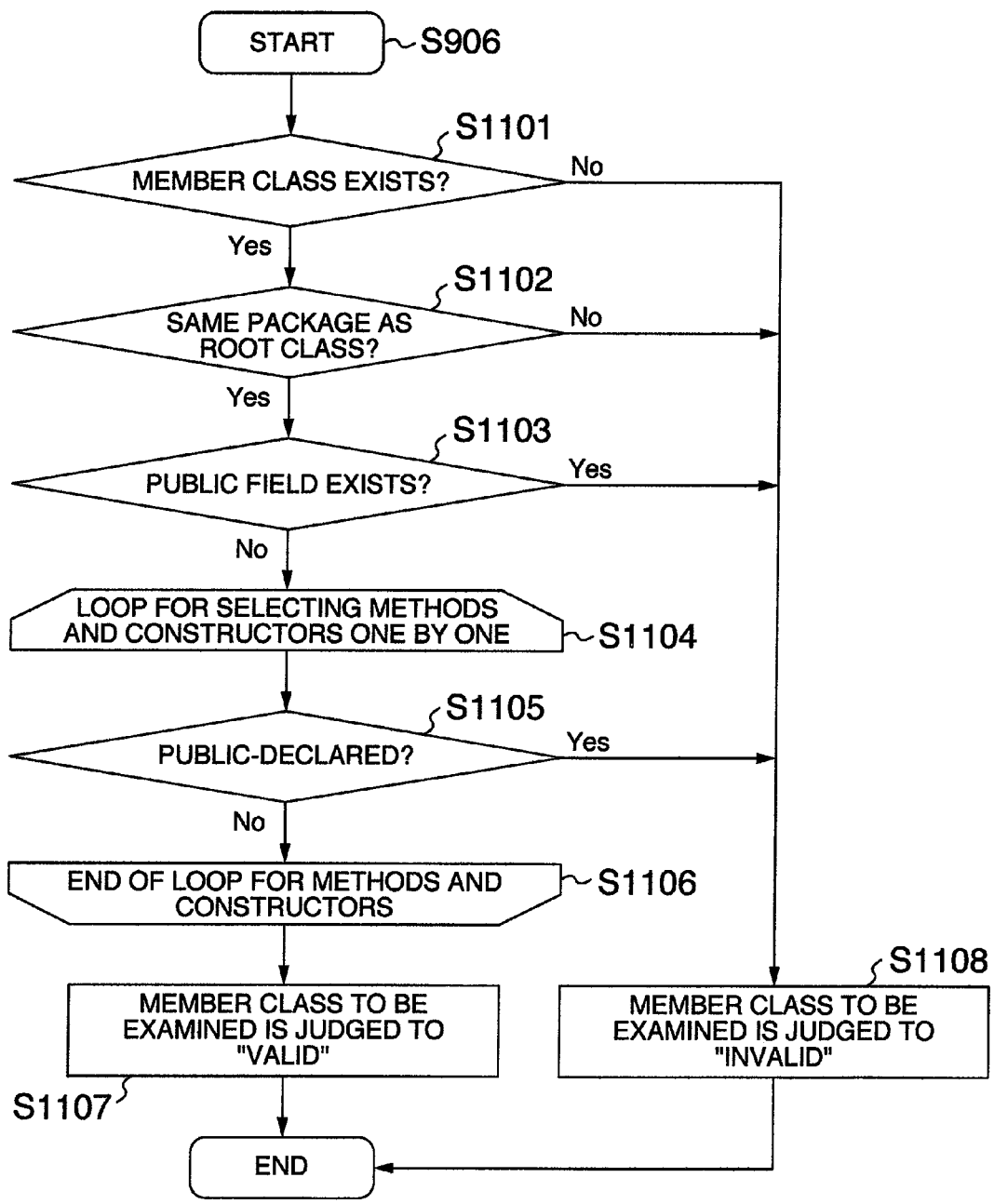
FIG. 17 is a flow chart showing processing executed by constraint format examination unit 32 to examine whether member class satisfies constraint format or not according to the embodiment of the present invention.

FIG. 17 is a flow chart showing processing executed by the constraint format examination unit 32 to examine whether the member class satisfies the constraint format or not. The processing of the flow chart is a subroutine called up by the processing of step S906.

In step S1101, the constraint format examination unit 32 judges whether the program of member class to be examined defined in the constraint set definition data 31 exists in the execution target program 10 inputted in step S31 or not. When judgment of step S1101 is satisfied, the processing proceeds to step S1102 and when it is not satisfied, the processing proceeds to step S1108.

In step S1102, it is judged whether the program of member class to be examined, which exists in the execution target program 10 inputted in step S31 is contained in the same package as root class or not. When judgment of step S1102 is satisfied, the processing proceeds to step S1102 and when it is not satisfied, the processing proceeds to step S1108.

In step S1103, it is judged whether public field exists in the program of member class to be examined or not. When judgment of step S1103 is satisfied, the processing proceeds to step S1108 and when it is not satisfied, the processing proceeds to step S1104.

In steps S1104 to S1106, loop processing for selecting methods and constructors of the program of member class to be examined one by one is executed. After the loop processing is executed, the processing proceeds to step S1107.

In step S1105, it is judged whether the selected method or constructor is public-declared or not. When the judgment of step S1105 is satisfied, the processing proceeds to step S1108.

In step S1107, it is judged that the member class to be examined is "valid".

In step S1108, it is judged that the member class to be examined is "invalid".

Figure 18:
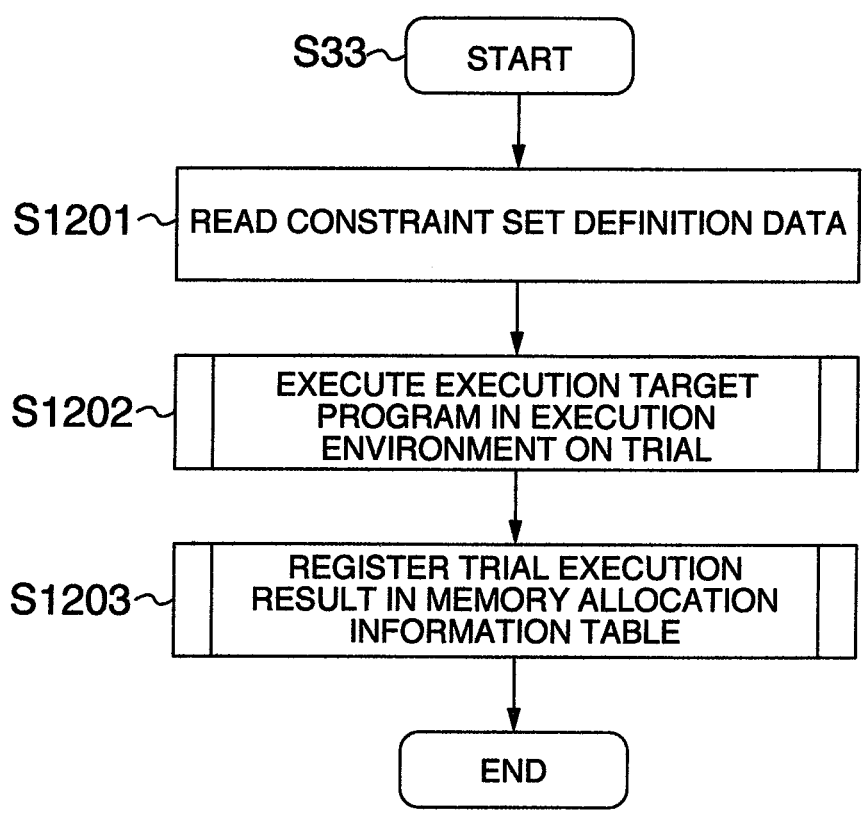
FIG. 18 is a flow chart showing trial execution processing of program executed by constraint trial execution unit 33 according to the embodiment of the present invention.

FIG. 18 is a flow chart showing trial execution processing of program, executed by the constraint trial execution unit 33. The processing of the flow chart is a subroutine called up by the processing of step S33 of FIG. 6.

In step S1201, the constraint trial execution unit 33 reads the constraint set definition data 31 inputted in step S11.

In step S1202, the constraint trial execution unit 33 executes the execution target program 10 utilizing the constrained set 12 in the program execution environment unit 60. Data of the trial execution result is stored in the constraint utilization information table 36. The trial execution processing of step S1202 is similar to operation processing (FIG. 7) of the program execution unit 50. Different points between the trial execution processing and the operation processing are as follows.

Figure 19:
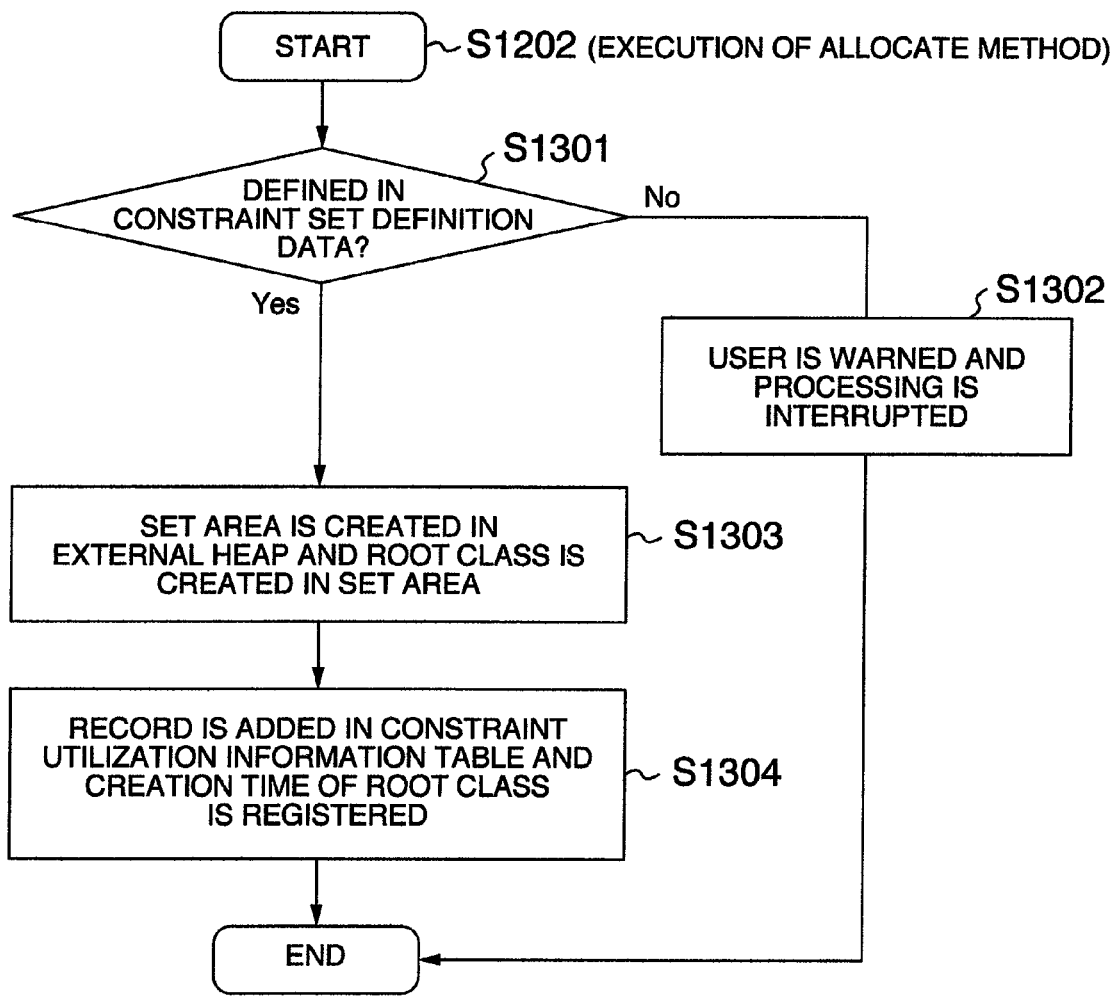
FIG. 19 is a flow chart showing area allocation processing of constrained set 12 executed by constraint root class disposition unit 34 according to the embodiment of the present invention.

(1) Subroutine of allocation processing called up by allocate method is changed over from case of operation processing (FIG. 8 executed by root class disposition unit 52) to case of trial execution processing (FIG. 19 executed by constraint root class disposition unit 34).

(2) Subroutine of release processing called up by release method is changed over from case of the operation processing (FIG. 9 executed by root class disposition unit 52) to case of trial execution processing (FIG. 20 executed by constraint root class disposition unit 34).

(3) Subroutine of movement processing called up at the time that object in New area of the internal heap 62 becomes movement target to Old area in processing of Copying GC unit 66 of the program execution environment unit 60 is processing of FIG. 10, although its movement subject is changed over from case of operation processing (member class disposition unit 53) to case of trial execution processing (constraint member class disposition unit 35).

(4) The heap area to which the target set 11 to be processed by three subroutines of above items (1) to (3) is allocated is changed over from case of operation processing (distributed to any of external heap 64 or internal heap 62 in accordance with the length of life time of the target set 11) to case of trial execution processing (become external heap 64 irrespective of the length of life time of the constrained set 12).

In step S1203, the constraint memory allocation information creation unit 37 creates memory allocation information from trial execution result of step S1202 stored in constraint utilization information table 36 and registers the memory allocation information in the memory allocation information table 40. Accordingly, subroutine shown in FIG. 21 is called up.

FIG. 19 is a flow chart showing area allocation processing of the constrained set 12, executed by the constraint root class disposition unit 34. The processing of the flow chart is a subroutine called up by the processing in the above item (1) of step S1202. The processing is mainly different from the allocation processing of FIG. 8 in that warning is issued without allocation to internal heap 62 (step S1302) and allocation result is registered in constraint utilization information table 36 (step S1304).

In step S1301, the constraint root class disposition unit 34 judges whether the constrained set 12 containing root class delivered by argument of allocate method is defined in the constraint set definition data 31 or not. When judgment of step S1301 is satisfied, the processing proceeds to step S1303 and when it is not satisfied, the processing proceeds to step S1302.

In step S1302, the user is warned to the effect that the constrained set 12 is not defined and the processing is interrupted.

In step S1303, the external heap processing unit 63 is used to create set area in the external heap 64 and root class delivered by argument of allocate method is created in the set area.

In step S1304, record is added in the constraint utilization information table 36 and creation time of root class is registered.

FIG. 20 is a flow chart showing area release processing of the constrained set 12, executed by the constraint root class disposition unit 34. The processing of the flow chart is a subroutine called up by the processing in the above item (2) of step S1202. The processing is mainly different from the release processing of FIG. 9 in that release result is registered in the constraint utilization information table 36.

In step S1401, the external heap processing unit 63 is used to release set area in the external heap 64. The set area is released to thereby release root class in the set area together as well.

In step S1402, release time of root class is registered in constraint utilization information table 36.

In step S1403, area size of the set area upon release in step S1401 is gotten from external heap processing unit 63 and is registered in the constraint utilization information table 36 as area size of the constrained set. Root class and member class of the constrained set are disposed in the set area of the external heap 64 during execution of execution target program 10 utilizing the constrained set 12. In the disposition of root class and member class, when there is no space in the set area, the external heap processing unit 63 automatically extends the set area. Accordingly, the area size of the set area upon release is the same as that occupied by root class and member class of the constrained set.

In step S1404, whether there is reference from object disposed in internal heap 62 to root class and member class of constrained set disposed in external heap 64 upon release of set area in external heap 64 or not is inquired to the external heap processing unit 63. The processing is branched in accordance with the inquiry result. When judgment of step S1404 is satisfied (there is reference), the processing proceeds to step S1405 and when it is not satisfied (no reference), the processing proceeds to step S1406.

Concrete examples of judging whether there is reference to each class or not in step S1404 are now described.

When reference to root class of constrained set is not cleared as a result that sentence "this. root=null;" of the execution target program 10 is not executed, there exists reference from object disposed in internal heap 62 to root class disposed in external heap 64.

In the exceptional processing concerning the fourth rule described in FIG. 16, when return value of public method of root class is package different from the root class and super class of member class and the public method returns the member class as return value, there exists reference from object disposed in internal heap 62 to member class disposed in external heap 64.

In step S1405, the column of "propriety of constrained set 12" in constraint utilization information table 36 is updated to "valid".

In step S1406, the column of "propriety of constrained set 12" in constraint utilization information table 36 is updated to "invalid".

FIG. 21 is a flow chart showing registration processing of the memory allocation information table 40, executed by the constraint memory allocation information creation unit 37. The processing of the flow chart is a subroutine called up by the processing of step S1203. The processing is mainly different from the registration processing of FIG. 14 in that the propriety of constrained set 12 is examined and trail execution result of constrained set 12 is used to create record for adding memory allocation information table 40 instead of using analysis result (statistical information) of target set 11.

In steps S1501 to S1509, loop processing for selecting one or more records for each of "name of constrained set" of the constraint utilization information table 36 is executed. Record added in memory allocation information table 40 is prepared by one record for each loop.

In one loop processing, when one record is selected from constraint utilization information table 36, "name of constraint set" of the record exists in the constraint utilization information table 36 solely.

In one loop processing, when a plurality of records are selected from constraint utilization information table 36, "names of constrained set" of the plurality of selected records are identical.

In step S1502, it is judged whether all contents in column of "propriety of constrained set" of selected record are "valid" or not. When judgment of step S1502 is satisfied, the processing proceeds to step S1504 and when it is not satisfied, the processing proceeds to step S1503.

In step S1503, whether memory allocation information of the constrained set 12 being processed in the current loop is created or not is inquired to the user. When judgment of step S1503 is satisfied, the processing proceeds to step S1504.

In step S1504, "name of constrained set" selected in this current loop is registered in column of "target set" for added record.

In step S1505, columns of "root class" and "member class" for added record are created. Accordingly, "constrained-set-name element" of constraint set definition data 31 (refer to Table 6) coincident with "name of constrained set" of constraint utilization information table 36 being processed in this current loop is searched for (e.g. 3rd and 10th lines).

Root-class element (e.g. 4th and 11th lines) in searched element is registered in column of "root class" for added record.

Member-class element (e.g. 5th to 7th lines and 12th line) in searched element is registered in column of "member class" for added record.

In step S1506, column of "average life time of root class" for added record is created. Concretely, difference in time between "creation time of root class" and "release time of root class" corresponding thereto contained in selected record of the constraint utilization information table 36 is calculated to thereby calculate the life time for one record. When a plurality of records are selected in one loop processing because of the same constraint set name, life times for the plurality of records are calculated and an average value of the life times is set as "average life time of root class".

In step S1507, column of "average area size of target set" for added record is created. Concretely, an average value of "area size of constrained set" contained in selected record of the constraint utilization information table 36 is set as "average life time of root class".

In step S1508, column elements for added records created in steps S1504 to S1507 are written in the memory allocation information table 40.

As described above, according to the embodiment, with regard to memory allocation destination of the target set 11 utilized by the execution target program 10, the heap area is divided into the internal heap 62 and the external heap 64 on the basis of life time of objects constituting the target set 11.

Consequently, the objects having short life time are often subjected to creation processing and release processing, although since the objects having short life time is allocated to the internal heap 62, the memory management therefor is performed automatically by GC. Accordingly, time and labor for memory management can be reduced by GC efficiently.

On the other hand, since the objects having long life time are allocated to the external heap 64, the objects are not managed by GC and processing load on GC can be reduced. Moreover, the frequency of subjecting the objects having long life time to creation processing and release processing is reduced and accordingly even if memory management is performed by execution target program 10 specifically, time and labor for memory management are not required so much.

Accordingly, the memory management method of the embodiment can utilize advantages of the internal and external heaps 62 and 64 in a well-balanced manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A memory management method in which a heap area in a memory to which objects are allocated is divided into an internal heap to which garbage collection (GC) is applied and an external heap which is managed by program specifically and an area to which object is allocated is decided on the basis of life time of object, wherein
a computer being configured to execute the memory management method comprises an input unit, a target set processing unit, memory allocation data and a program execution unit in addition to the memory constituting the internal heap and the external heap, and
the input unit is configured to receive execution target program, set definition data representing sets of objects utilized by the execution target program and analysis program utilizing the sets of objects represented by the set definition data, the method comprising the following steps performed by the target set processing unit:

executing the analysis program on trial to get life periods from creation time to release time in memory for the sets of objects utilized by the analysis program and calculate life times of objects on the basis of length of the gotten life periods, and storing names of sets of objects and average values of life times of objects for root class designated by the set definition data out of objects constituting the sets of the objects in a corresponding manner to each other as the memory allocation data in storage means, and the method further comprising the following steps performed by the program execution unit:

when executing a creation instruction of the objects utilized by the execution target program in process of executing the execution target program, disposing a created object in the internal heap when a life period of the created object is not contained within life period of the objects for root class, and getting average value of life time corresponding to set of objects to which the created object belongs with reference to the memory allocation data, disposing the created object as a long-life object in the external heap when the gotten average value of life time is equal to or larger than an execution interval of garbage collection (GC), and disposing the created object as a short-life object in the internal heap when the gotten average value of life time is smaller than the execution interval of GC, wherein the program execution unit is configured to extract object which is to be moved from New area to Old area within the internal heap as a result of subjecting the object disposed in the internal heap to execution of Copying GC processing in process of executing the execution target program, and when the average value of life time is equal to or larger than the execution interval of GC, change the disposition destination of objects which belong to a member class to which the extracted object belongs from the internal heap to the external heap.

2. A memory management method in which a heap area in a memory to which objects are allocated is divided into an internal heap to which garbage collection (GC) is applied and an external heap which is managed by program specifically and an area to which object is allocated is decided on the basis of life time of object, wherein a computer being configured to execute the memory management method comprises an input unit, a constraint set processing unit, memory allocation data and a program execution unit in addition to the memory constituting the internal heap and the external heap, and the input unit is configured to receive execution target program and constraint set definition data representing sets of objects utilized by the execution target program, the method comprising the following steps performed by the constrained set processing unit:

executing the execution target program on trial to get life periods from creation time to release time in memory for the sets of objects utilized by the execution target program and calculate life times of objects on the basis of length of the gotten life periods;

reading the execution target program and judging whether predetermined rule is satisfied or not by referring to access modifier described by definition sentence of each class in the execution target program, wherein the predetermined rule being a rule for prescribing that objects for root class out of sets of objects can be utilized from outside of sets of objects but objects for member class except root class out of sets of objects cannot be utilized from outside of sets of objects; and storing names of sets of objects and average values of life times of objects for root class designated by the constraint set definition data out of objects constituting the sets of the objects in a corresponding manner to each other as the memory allocation data in storage means;

the method further comprising the following steps performed by the program execution unit:

when executing a creation instruction of the objects utilized by the execution target program in process of executing the execution target program, disposing a created object in the internal heap when the execution target program utilizing the created object does not satisfy the predetermined rule; and getting average value of life time corresponding to set of objects to which the created object belongs with reference to the memory allocation data, disposing the created object as a long-life object in the external heap when the gotten average value of life time is equal to or larger than an execution interval of garbage collection (GC), and disposing the created object as a short-life object in the internal heap when the gotten average value of life time is smaller than the execution interval of GC, wherein the program execution unit is configured to extract object which is to be moved from New area to Old area within the internal heap as a result of subjecting the object disposed in the internal heap to execution of Copying GC processing in process of executing the execution target program, and when the average value of life time is equal to or larger than the execution interval of GC, change the disposition destination of objects which belong to a member class to which the extracted object belongs from the internal heap to the external heap.

3. A memory management method according to claim 2, wherein the constrained set processing unit is configured to judge, when object disposed in the external heap is released in process of executing the execution target program on trial, the set of objects to which the object to be released belongs to be invalid when the object to be released is being referred to by objects disposed in the internal heap, and the program execution unit is configured to dispose the created object in the internal heap when the set of objects to which the created object belongs is judged to be invalid.

4. A memory management method according to claim 1, wherein in the memory allocation data, average area size at time that set of objects is created in the trial execution processing is made to correspond to name of the set of objects, and the method further comprising the step of conforming area size of object for disposing it in the external heap to the average area size read from the memory allocation data by the program execution unit.

5. A memory management method according to claim 2, wherein in the memory allocation data, average area size at time that set of objects is created in the trial execution processing is made to correspond to name of the set of objects, and the method further comprising the step of conforming area size of object for disposing it in the external heap to the average area size read from the memory allocation data by the program execution unit.

6. A nontransitory program storing medium for storing a computer-readable information processing program for making a computer execute the memory management method according to claim 1.

7. A memory management apparatus in which a heap area in a memory to which objects are allocated is divided into an internal heap to which garbage collection (GC) is applied and an external heap which is managed by program specifically and an area to which object is allocated is decided on the basis of life time of object, comprising:

an input unit, a target set processing unit, memory allocation data and a program execution unit in addition to the memory constituting the internal heap and the external heap;

the input unit receiving execution target program, set definition data representing sets of objects utilized by the execution target program and analysis program utilizing the sets of objects represented by the set definition data;

the target set processing unit performing the following:

executing the analysis program on trial to get life periods from creation time to release time in memory for the sets of objects utilized by the analysis program and calculate life times of objects on the basis of length of the gotten life periods; and storing names of sets of objects and average values of life times of objects for root class designated by the set definition data out of objects constituting the sets of the objects in a corresponding manner to each other as the memory allocation data in storage means;

the program execution unit performing, when executing a creation instruction of the objects utilized by the execution target program in process of executing the execution target program, the following:

disposing a created object in the internal heap when a life period of the created object is not contained within life period of the objects for root class; and getting average value of life time corresponding to set of objects to which the created object belongs with reference to the memory allocation data, disposing the created object as a long-life object in the external heap when the gotten average value of life time is equal to or larger than an execution interval of garbage collection (GC), and disposing the created object as a short-life object in the internal heap when the gotten average value of life time is smaller than the execution interval of GC, wherein the program execution unit is configured to extract object which is to be moved from New area to Old area within the internal heap as a result of subjecting the object disposed in the internal heap to execution of Copying GC processing in process of executing the execution target program, and when the average value of life time is equal to or larger than the execution interval of GC, change the disposition destination of objects which belong to a member class to which the extracted object belongs from the internal heap to the external heap.

8. A memory management apparatus in which a heap area in a memory to which objects are allocated is divided into an internal heap to which garbage collection (GC) is applied and an external heap which is managed by program specifically and an area to which object is allocated is decided on the basis of life time of object, comprising:

an input unit, a constraint set processing unit, memory allocation data and a program execution unit in addition to the memory constituting the internal heap and the external heap;

the input unit receiving execution target program and constraint set definition data representing sets of objects utilized by the execution target program;

the constrained set processing unit performing the following:

executing the execution target program on trial to get life periods from creation time to release time in memory for the sets of objects utilized by the execution target program and calculate life times of objects on the basis of length of the gotten life periods;

reading the execution target program and judging whether predetermined rule is satisfied or not by referring to access modifier described by definition sentence of each class in the execution target program;

the predetermined rule being a rule for prescribing that objects for root class out of sets of objects can be utilized from outside of sets of objects but objects for member class except root class out of sets of objects cannot be utilized from outside of sets of objects; and storing names of sets of objects and average values of life times of objects for root class designated by the constraint set definition data out of objects constituting the sets of the objects in a corresponding manner to each other as the memory allocation data in storage means;

the program execution unit performing, when executing a creation instruction of the objects utilized by the execution target program in process of executing the execution target program, the following:

disposing a created object in the internal heap when the execution target program utilizing the created object does not satisfy the predetermined rule; and getting average value of life time corresponding to set of objects to which the created object belongs with reference to the memory allocation data, disposing the created object as a long-life object in the external heap when the gotten average value of life time is equal to or larger than an execution interval of garbage collection (GC), and disposing the created object as a short-life object in the internal heap when the gotten average value of life time is smaller than the execution interval of GC, wherein the program execution unit is configured to extract object which is to be moved from New area to Old area within the internal heap as a result of subjecting the object disposed in the internal heap to execution of Copying GC processing in process of executing the execution target program, and when the average value of life time is equal to or larger than the execution interval of GC, change the disposition destination of objects which belong to a member class to which the extracted object belongs from the internal heap to the external heap.

9. A memory management method according to claim 1, wherein the garbage collection (GC) comprises Mark and Sweep GC or Copying GC.

10. A memory management method according to claim 2, wherein the garbage collection (GC) comprises Mark and Sweep GC or Copying GC.

11. A memory management apparatus according to claim 7, wherein the garbage collection (GC) comprises Mark and Sweep GC or Copying GC.

12. A memory management apparatus according to claim 8, wherein the garbage collection (GC) comprises Mark and Sweep GC or Copying GC.

13. A memory management method according to claim 1, wherein the execution interval of GC is execution interval of Mark and Sweep GC.

14. A memory management method according to claim 2, wherein the execution interval of GC is execution interval of Mark and Sweep GC.

15. A memory management apparatus according to claim 7, wherein the execution interval of GC is execution interval of Mark and Sweep GC.

16. A memory management apparatus according to claim 8, wherein the execution interval of GC is execution interval of Mark and Sweep GC.

\* \* \* \* \*